(12) United States Patent
Hara et al.

(10) Patent No.: US 8,161,256 B2
(45) Date of Patent: Apr. 17, 2012

(54) REMOTE COPY SYSTEM AND PATH SETTING SUPPORT METHOD

(75) Inventors: Junichi Hara, Sagamihara (JP); Nobuhiro Maki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 509 days.

(21) Appl. No.: 12/382,667

(22) Filed: Mar. 20, 2009

(65) Prior Publication Data
US 2010/0191926 A1    Jul. 29, 2010

(30) Foreign Application Priority Data
Jan. 27, 2009   (JP) .................... 2009-015370

(51) Int. Cl.
G06F 12/00   (2006.01)
G06F 15/16   (2006.01)
(52) U.S. Cl. .................. 711/162; 709/217; 711/156
(58) Field of Classification Search .............. 711/156, 711/162; 709/217
See application file for complete search history.

(56) References Cited

U.S. PATENT DOCUMENTS

| | | | | |
|---|---|---|---|---|
| 6,173,377 B1* | 1/2001 | Yanai et al. | ................. | 711/162 |
| 2005/0132156 A1 | 6/2005 | Hosouchi et al. | | |
| 2005/0251633 A1* | 11/2005 | Micka et al. | ................. | 711/162 |
| 2006/0026374 A1* | 2/2006 | Ikegaya et al. | ................. | 711/165 |
| 2006/0112245 A1 | 5/2006 | Ikegaya et al. | | |
| 2007/0033357 A1* | 2/2007 | Fujibayashi | .................. | 711/162 |
| 2008/0104347 A1* | 5/2008 | Iwamura et al. | ............. | 711/162 |
| 2008/0244035 A1* | 10/2008 | Horie | ............................ | 709/217 |
| 2008/0301386 A1* | 12/2008 | Matsui et al. | ................ | 711/162 |
| 2009/0031320 A1* | 1/2009 | Nakagawa et al. | ........... | 718/104 |
| 2009/0037677 A1* | 2/2009 | Coronado et al. | ........... | 711/162 |

FOREIGN PATENT DOCUMENTS
JP    2005-182130    12/2003

* cited by examiner

*Primary Examiner* — Kevin Ellis
*Assistant Examiner* — Mehdi Namazi
(74) *Attorney, Agent, or Firm* — Stites & Harbison, PLLC; Juan Carlos A. Marquez, Esq

(57) ABSTRACT

A remote copy system includes: a host computer; a first storage system connected to the host computer; and a second storage apparatus connected to the first storage system. At least one of the first storage system and the second storage system holds, in a storage part thereof, path information used for performing a remote copy of data therebetween. The host computer references the path information in the storage part; determines whether or not a path required for conducting an operation instructed by a user exists, based on at least one of a type of the remote copy and a direction of the path; and, if the required path does not exist, displays, on a display part, that the necessary path does not exist and why the necessary path does not exist.

15 Claims, 21 Drawing Sheets

FIG. 5

500 Port Table

| Initiator Port | Reachable Node | Reachable Port |
|---|---|---|
| CL1-C | DKC-E | CL3-A |
| CL1-D | DKC-S | CL2-B |

600 Remote Path Table

| Initiator Storage | Initiator Port | Target Storage | Target Port |
|---|---|---|---|
| DKC-S | CL2-A | DKC-P | CL1-B |

1200a Port Table

| Initiator Port | Reachable Node | Reachable Port |
|---|---|---|
| CL1-B | DKC-R | CL2-B |
| CL1-E | DKC-L | CL3-C |

501 / 502 / 503

1200b Port Table

| Initiator Port | Reachable Node | Reachable Port |
|---|---|---|
| CL2-C | DKC-P | CL1-C |
| CL2-E | DKC-L | CL3-E |

1200c Port Table

| Initiator Port | Reachable Node | Reachable Port |
|---|---|---|
| CL3-B | DKC-P | CL1-D |
| CL3-D | DKC-R | CL2-D |

1400 Path Requirement Table

| Copy Type | Path Requirement |
|---|---|
| RCS | Primary to Secondary |
| RCA | Primary to Secondary |
| RCD | Bi-Direction |
| Delta | Bi-Direction |

FIG. 16

1600 Copy Definition Table

| Group | Copy Type | Primary Storage System | Primary Volume | Secondary Storage System | Secondary Volume |
|---|---|---|---|---|---|
| Group-PR | RCD | DKC-P | Vol-P1 | DKC-R | Vol-R1 |
| Group-PR | RCD | DKC-P | Vol-P2 | DKC-R | Vol-R2 |
| Group-PL | RCS | DKC-P | Vol-P1 | DKC-L | Vol-L1 |
| Group-PL | RCS | DKC-P | Vol-P2 | DKC-L | Vol-L2 |
| Group-LR | Delta | DKC-L | Vol-L1 | DKC-R | Vol-R1 |
| Group-LR | Delta | DKC-L | Vol-L2 | DKC-R | Vol-R2 |

2000a Port Table

| Initiator Port | Status | Reachable Node | Reachable Port |
|---|---|---|---|
| CL1-B | External | DKC-E | CL0-A |
| CL1-C | RC | DKC-I1 | CL2-A |
| CL1-C | RC | DKC-I2 | CL4-A |

2000b Port Table

| Initiator Port | Status | Reachable Node | Reachable Port |
|---|---|---|---|
| CL2-B | Unused | DKC-P | CL1-D |
| CL2-B | Unused | DKC-I2 | CL4-A |
| CL2-D | Unused | DKC-S1 | CL3-C |
| CL2-D | Unused | DKC-S2 | CL5-A |

2001 — Initiator Port
2002 — Status
2003 — Reachable Node
2004 — Reachable Port

FIG. 21

2100a Remote Path Table

| Initiator Storage | Initiator Port | Target Storage | Target Port |
|---|---|---|---|
| DKC-P | CL1-C | DKC-I1 | CL2-A |

601, 602, 603, 604

2100b Remote Path Table

| Initiator Storage | Initiator Port | Target Storage | Target Port |
|---|---|---|---|
| DKC-P | CL1-C | DKC-I1 | CL2-A |
| DKC-S1 | CL3-B | DKC-I1 | CL2-C |

FIG. 22

2200 External Port List

| Initiator Port |
|---|
| CL1-B |

REMOTE COPY SYSTEM AND PATH SETTING SUPPORT METHOD

CROSS REFERENCE TO RELATED APPLICATIONS

This application claims the benefit of Japanese Patent Application No. 2009-015370 filed on Jan. 27, 2009, the disclosure of which is incorporated herein by reference.

BACKGROUND OF THE INVENTION

1. Field of the Invention

The present invention relates to a remote copy system including a host computer and a storage apparatus, and to a path setting support method for supporting a network path setting between storage apparatuses which is especially required in copying data between a plurality of storage apparatuses.

2. Description of the Related Art

Along with the development of the information-oriented society, information systems in business enterprises have become increasingly important in these years. As a result, if such information systems go down due to unexpected circumstances such as a natural disaster, terrorism, and hacking, a loss incurred by those businesses has also been more and more increased. Thus, a system of disaster recovery has been widely used as a solution to ensure operation continuity of the information systems even under such circumstances.

The system of disaster recovery is configured to have a primary site for operating an information system at normal times and a secondary site for substituting the primary site at emergencies. At normal times, data is copied from the primary site to the secondary site. If operations at the primary site become difficult or impossible, the data copied into the secondary site is used to continue operations of the information system.

As a fundamental technology to realize such a disaster recovery, there have been known a remote copy technology for copying data from a storage apparatus into a remotely-located storage apparatus via a network path created between the storage apparatuses, and a remote copy function using the remote copy technology.

In the remote copy technology, a copy source and a copy destination are generally set by the volume which is a management unit of a storage area in a storage apparatus. Two volumes paired as a copy source arid a copy destination are called a copy pair. A copy pair is grouped by the host computer or by the application, by which the copy pair is managed. A plurality of copy pairs grouped by the host computer or by the application is called a copy group There are two main types of remote copy technology, namely, a synchronous copy and an asynchronous copy.

In the synchronous copy, upon a write instruction of data from a host computer at a primary site (a primary host) to a storage apparatus at a primary site (a primary storage), the primary storage writes the data in a storage area therein and transmits the data to a storage apparatus at a secondary site (a secondary storage). Then, after a write of the data in a storage area in the secondary storage is completed, the primary storage acknowledges the completion of the write of the data to the primary host. This means that data in the primary storage and that in the secondary storage are always synchronized. Even if the primary site becomes inaccessible due to a disaster or the like, the secondary site can smoothly substitute the primary site without any data loss. The synchronous copy is suitable for a remote copy between relatively short-distanced storage apparatuses (for example, less than 100 km in distance) because the further the distance between the storage apparatuses becomes, the longer the response time from the primary storage to the primary host becomes.

Meanwhile, in the asynchronous copy, upon a write instruction of data from the primary host to the primary storage, the primary storage writes the data in a storage area therein and, after the write of the data therein is completed, acknowledges the completion of the write of the data to the primary host. The primary storage transmits the data to the secondary storage only after data instructed to be written prior to the data of interest but not yet transmitted to the secondary storage, if any, is all transmitted to the secondary storage. This means that there is a lag from the time when the primary host transmits the write instruction of data to the primary storage until the time when the primary storage transmits the data to the secondary storage. Thus, if the primary site becomes inaccessible due to a disaster or the like, the secondary site may have data loss. The asynchronous copy is suitable for a remote copy between relatively long-distanced storage apparatuses (for example, more than 100 km in distance) because the response time from the primary storage to the primary host does not depend on a distance between the storage apparatuses.

There are two types of asynchronous copy, namely, a push type and a pull type. In the push remote copy, a primary storage transmits data to a secondary storage and also controls a guaranteed order of the data or the like, which places a high load on the primary storage. Meanwhile, in the pull remote copy, the secondary storage acquires data from the primary storage and controls a guaranteed order of the data or the like, which lowers a load placed on the primary storage. The pull asynchronous remote copy has been increasingly used so as to reduce a load on the primary storage which keeps operating at normal times.

A 3DC (three data centers) solution has been in widespread use recently which combines a synchronous copy and an asynchronous copy and can prevent problems of both a limited distance in the synchronous copy and a data loss in the asynchronous copy. In the 3DC solution, two secondary sites are deployed at short and long distances from the primary site. A synchronous copy is performed from the primary site to the short-distanced secondary site, and an asynchronous copy, to the long-distanced secondary site. The primary site is substituted by the short-distanced secondary site in case of a localized disaster, and by the long-distanced secondary site in case of a wide-area disaster. This can minimize the data loss. Further, a function of so-called delta re-synchronization has also been provided for automatically starting a remote copy from the short-distanced secondary site to the long-distanced secondary site, upon a switchover of operations from the primary site to the short-distanced secondary site. Note that a system configuration based on the 3DC solution is referred to as a 3DC configuration. A system configuration having one primary site and one secondary site is referred to as a 2DC configuration.

Japanese Laid-Open Patent Application, Publication No. 2005-182130 discloses automatic definition and control of a transmitting route of a remote command in the remote copy technology. US Patent Application, Publication No. 2006/0112245 discloses a technique of coupling, to a host computer, a plurality of storage apparatuses in which one storage apparatus is coupled to other storage apparatuses in multiple stages.

To use a remote copy function between storage apparatuses, a network path is required to be set between the storage apparatuses. The network path typically uses a SAN (Storage Area Network) based on a fiber channel protocol and a SCSI (Small Computer System Interface) command used as a network between a host computer and a storage apparatus. Unlike an ordinary network protocol such as the IP (Internet Protocol), the SAN requires a setting which distinguishes an initiator from which data is transmitted, from a target to which the data is transmitted. The setting is needed for each host or port of a storage so as to give a correct direction to the network path.

Another setting of a network path referred to as a remote path setting is required which previously specifies a pair of an initiator port and a target port for use in a remote copy. This is because an initiator port is also used for making use of an external connection function in which a storage apparatus is connected to another storage apparatus, and a target port is also used for connecting a storage apparatus to a host computer. Also, a direction of a remote path differs according to a copy type (push or pull) used in the remote copy. Further, the remote path is required to be set each of the pairs of storage apparatuses. In a configuration for a 3DC solution, the setting is required to be performed for the pairs of a primary site and a short-distanced site, the pairs of a primary site and a long-distanced site, and the pairs of a short-distanced site and a long-distanced site.

As described above, a remote path setting between storage apparatuses is complicated because the setting varies depending on the copy type and the direction of a remote path between the storage apparatuses. Actually, inappropriate settings have prevented normal operations in such cases as a discovery (a remote scan) from a storage apparatus at a primary site to a storage apparatus at a secondary site, and a copy pair definition. Those problems cannot be efficiently solved even with the technologies as disclosed in Japanese Laid-Open Patent Application, Publication No. 2005-182130 and US Laid-Open Patent Application, Publication No. 2006/0112245.

The present invention has been made in light of the above circumstances and in an attempt to solve the problems by supporting a user in ensuring a remote path setting between storage apparatuses.

SUMMARY OF THE INVENTION

According to an aspect of the present invention, a remote copy system includes: one or more host computers; a first storage apparatus coupled to the host computer for conducting a read/write of data upon an instruction from the host computer; and a second storage apparatus coupled to the first storage apparatus for performing a remote copy in which the data received from the first storage apparatus is stored.

At least one of the first storage apparatus and the second storage apparatus holds, in a storage part thereof, path information used for performing the remote copy of the data therebetween.

The host computer references the path information in the storage part; determines whether or not a path required for conducting an operation instructed by a user exists, based on at least one of a type of the remote copy and a direction of the path; and, if the required path does not exist, displays, on a display part, that the required path does not exist and why the required path, which has been searched based on at least one of the type of the remote copy and the direction of the path, does not exist.

Other features and advantages of the present invention will become more apparent from the following detailed description of the invention, when taken in conjunction with the accompanying exemplary drawings.

BRIEF DESCRIPTION OF THE DRAWINGS

FIG. 5 is a diagram showing an example of a port table according to the first embodiment.

FIG. 6 is a diagram showing an example of a remote path table according to the first embodiment.

FIG. 12 is a diagram showing an example of a port table according to the second embodiment.

FIG. 16 is a diagram showing an example of a copy definition table according to the second embodiment.

FIG. 20 is a diagram showing an example of a port table according to the third embodiment.

FIG. 21 is a diagram showing an example of a remote path table according to the third embodiment.

FIG. 22 is a diagram showing an example of an external port list according to the third embodiment.

DETAILED DESCRIPTION OF THE EXEMPLARY EMBODIMENTS

Figure 1:
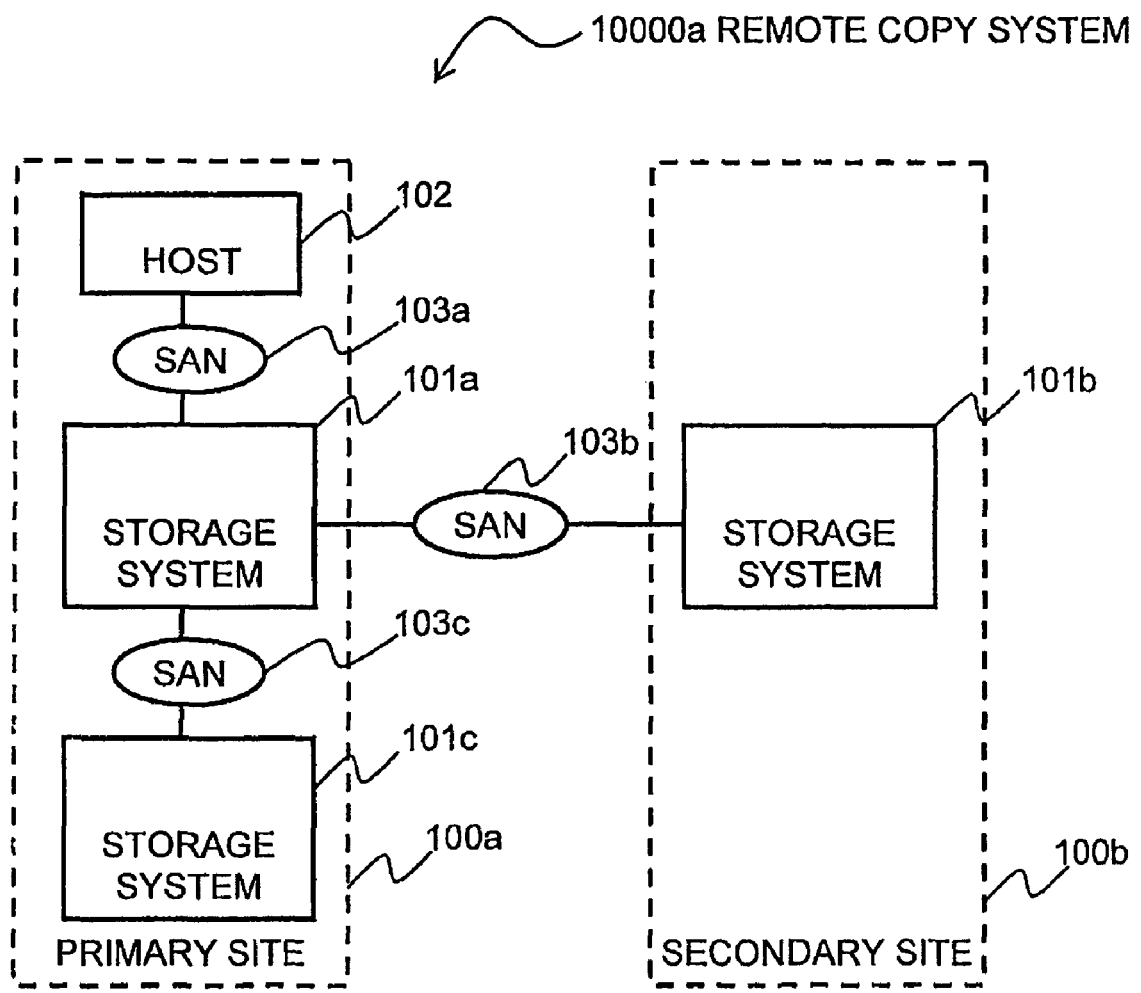
FIG. 1 is an overall block diagram showing a remote copy system according to a first embodiment.

Embodiments of the present invention are described next in detail with reference to the related drawings.

It is to be noted that, for example, any one or more (including all) of reference numerals "101*a*", "101*b*" and "101*c*"

may be collectively represented by "101". Further, same reference numerals are used in different figures for the components having substantially same functions, and description thereof is omitted herefrom or is simplified.

<First Embodiment>

With reference to FIG. 1 to FIG. 7, description is given on a first embodiment of the present invention.

As shown in FIG. 1, a remote copy system 10000a includes a primary site 100a and a secondary site 100b which are located apart from each other, that is, has a configuration of 2DC. The primary site 100a includes a host 102 (which may also be referred to as a host computer), a storage system 101a (which may also be referred to as a first storage apparatus), and a storage system 101c. The host 102 and the storage system 101a are connected to each other via a SAN (Storage Area Network) 103a. The storage system 101a and the storage system 101c are connected to each other via a SAN 103c. For an explanatory purpose, FIG. 1 shows a state in which the storage system 101c is provided at the primary site 100a. However, the storage system 101c may not be necessary.

The secondary site 100b includes a storage system 101b (which may also be referred to as a second storage apparatus). The storage system 101b and the storage system 101a at the primary site 100a are connected to each other via a SAN 103b.

The SAN 103a, SAN 103b, and SAN 103c typically each include a SAN switch. The SAN 103b, which is used for connecting the sites, also typically has an extender for extending a reachable distance. Note that, in this embodiment, the SANs 103a, 103b, 103c are independent networks. However, they may be included in a single SAN. Or, one or more may be independent and the others not.

Figure 2:
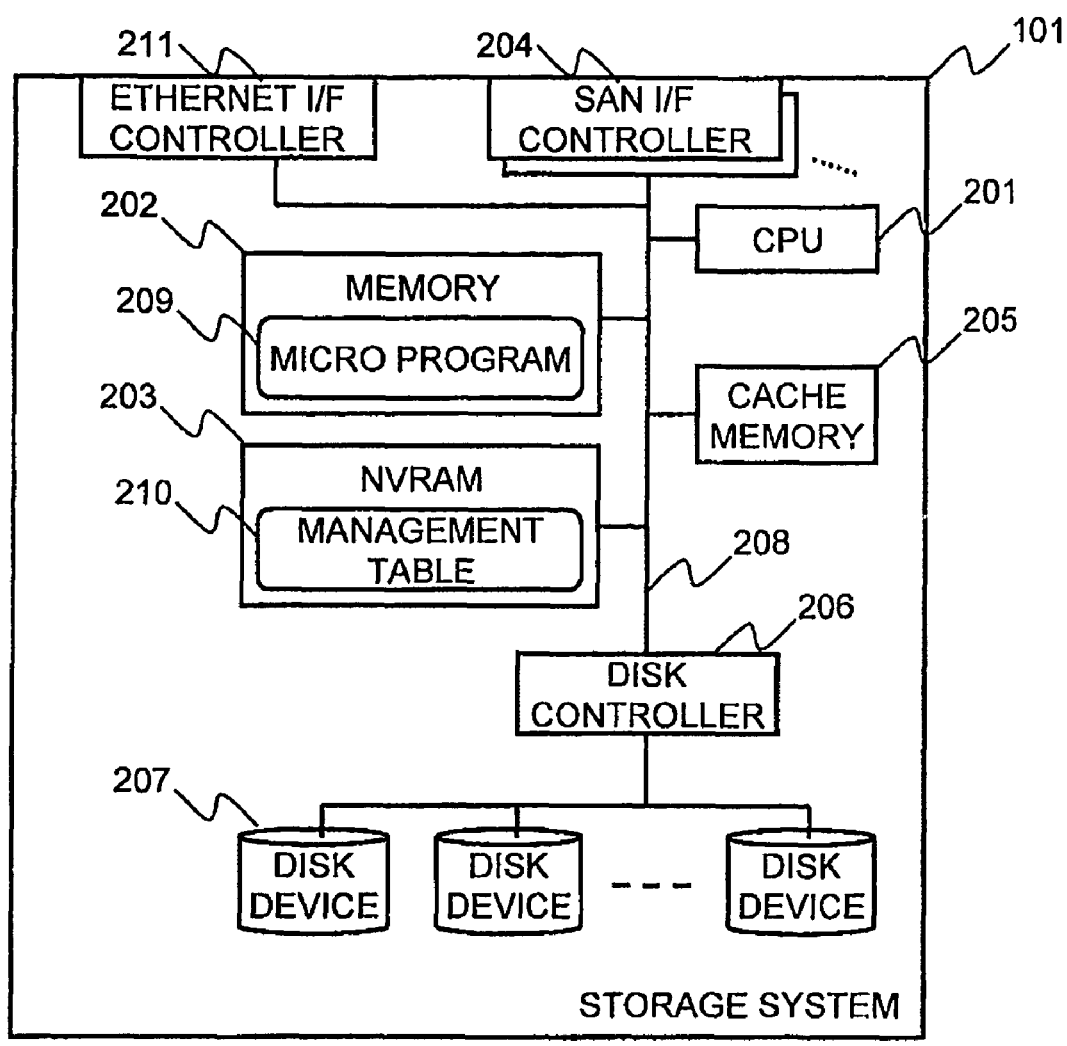
FIG. 2 is a diagram showing a configuration of a storage system according to the first embodiment and a third embodiment.

As shown in FIG. 2, the storage system 101 includes: a CPU 201; a memory 202; a NVRAM (Non Volatile Random Access Memory) 203 which is a nonvolatile memory for storing a management table 210 including information on various managements; one or more SAN I/F (interface) controllers 204 each for serving as a port connected to the SAN 103 and controlling data transmitted/received via the SAN 103; a cache memory 205 for temporarily storing data; a disk controller 206 for managing a plurality of disk devices 207 as a whole, based on RAIDs (Redundant Array of Inexpensive Disks); and an Ethernet (registered trademark) I/F controller 211 for use in a connection to a management network, all of which are connected to each other via an internal bus 208. In the first embodiment, the Ethernet I/F controller 211 may not be necessary. The SAN I/F controller 204 may also be referred to as a port for simplification. The storage system 101 herein executes a micro program 209 stored in the disk device 207 by loading the micro program 209 in the memory 202 and using the CPU 201.

Figure 3:
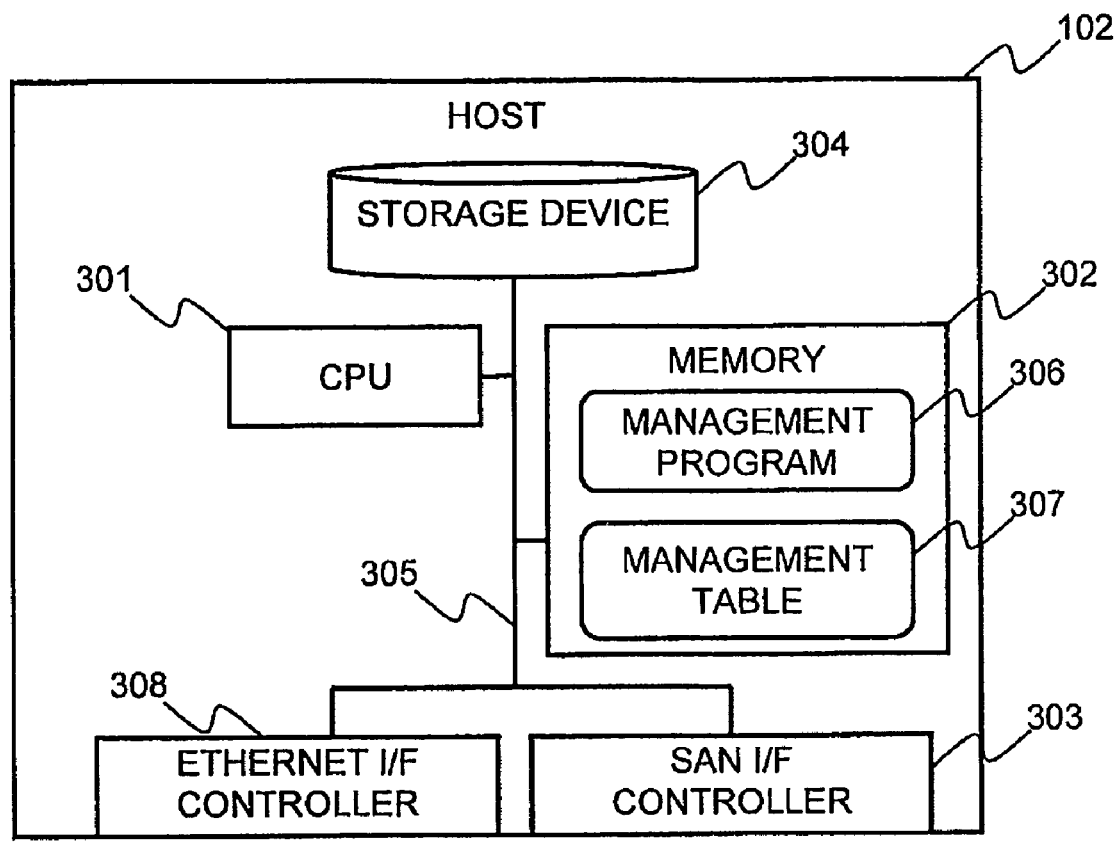
FIG. 3 is a diagram showing an internal configuration of a host according to the first and third embodiments.

As shown in FIG. 3, the host 102 serves as a port connected to the SAN 103, in addition to the CPU 301 and the memory 302. The host 102 includes: a SAN I/F controller 303 for controlling data transmitted/received via the SAN 103; a storage device 304 for storing therein a management program 306; and an Ethernet I/F controller 308 for use in a connection to other host computer or the management network, all of which are connected to each other via an internal bus 305. In the first embodiment, the Ethernet I/F controller 308 may not be necessary. The host 102 executes the management program 306 stored in the storage device 304 by loading the management program 306 in the memory 302 and using the CPU 301. The management program 306 maintains the management table 307 including information on various managements in the memory 302.

Description below is made assuming a state shown in FIG. 4 according to the necessity. One SAN I/F controller 303 exists on the host 102. The SAN I/F controller 303 operates as an initiator port 407 having an identifier of Port-P (which may also be referred to as "Port-P 407", ditto below) and is connected to the SAN 103a. Further, four SAN I/F controllers 204 exist in the storage system 101a. Among the four SAN I/F controllers 204, a target port 406 having an identifier of CL1-A is connected to the SAN 103a; a target port 403 having an identifier of CL1-B and an initiator port 412 having an identifier of CL1-D, to the SAN 103b; and an initiator port 409 having an identifier of CL1-C, to the SAN 103c.

The Port-P 407 on the host 102 is required to be an initiator port, because the Port-P 407 is a port used by the host 102 in using a storage area in the storage system 101a (a port used for transmitting a data to be written). On the other hand, the CL1-A 406 is required to be a target port, because the CL1-A 406 is a port used for providing a storage area in the storage system 101a (a port used for receiving a data to be written). In FIG. 4, if an arrow extends from any of the ports to any of the SANs, the port is an initiator port. If an arrow extends from any of the SANs to any of the ports, the port is a target port.

The storage system 101 divides a storage area in the disk device 207 and manages the divided areas as a volume 401 (401a, 401b, 401c, . . . ). The storage system 101a is connected to the storage system 101c via the SAN 103c. A volume in the storage system 101c is mapped as a virtual volume 402 in the storage system 101a and is provided to the host 102. A function of mapping a volume in one storage system on another storage system is called an external connection function. Using a technique of the external connection function, a storage system as a source of a connection (for example, the storage system 101a) works similarly to a host computer (for example, the host 102), to a storage system as a target of the connection (which provides a storage area) (for example, the storage system 101c). That is, the port CL1-C 409 in the storage system 101a used for the connection needs to be an initiator port, and the port CL3-A 410 in the storage system 101c needs to be a target port.

It is assumed herein that a user sets the CL1-B 403 in the storage system 101a as a target port, and the CL1-D 412, as an initiator port. Further, the CL2-A 404 in the storage system 101b, as an initiator port, and the CL2-B 405, as a target port.

It is also assumed herein that an identifier DKC-P is assigned to the storage system 101a; an identifier DKC-S, to the storage system 101b; and an identifier DKC-E, to the storage system 101c.

FIG. 5 shows a port table 500 (which may also be referred to as port information) which is created by the micro program 209 of the storage system 101a in the state shown in FIG. 4 (herein, to be more particular, it is the CPU 201 that actually executes such an operation, ditto below) and is maintained as a portion of the management table 210. The port table 500 includes an initiator port 501, a reachable node 502, and a reachable port 503. In the SAN based on the fiber channel protocol and SCSI command, when a port is connected to a network, a procedure called a fabric login is Conducted. In particular, if the port is an initiator port, a list of accessible target port and node is acquired from a name server which is a program in a SAN switch included in the SAN, upon the login procedure. The node used herein means a system having a target port, which corresponds to the host 102 or the storage system 101 in FIG. 4. The micro program 209 maintains the list of accessible target port and node acquired when the initiator port is connected to the network, into a port table 500 shown in FIG. 5.

FIG. 6 shows a remote path table 600 (which may also be referred to as path information) which is maintained by the storage system 101*a* as a portion of the management table 210. The remote path table 600 includes an initiator storage 601, an initiator port 602, a target storage 603, and a target port 604. The remote path table 600 maintains a remote path setting which is set by the user into the storage system 101*a* via the management program 306 of the host 102. In FIG. 6, it is assumed that the user has set the initiator port CL2-A 404 having the identifier DKC-S in the storage system 101*b* and the target port CL1-B 403 having the identifier DKC-P in the storage system 101*a* which are paired as a remote path for use in a data transfer of a remote copy.

Figure 7:
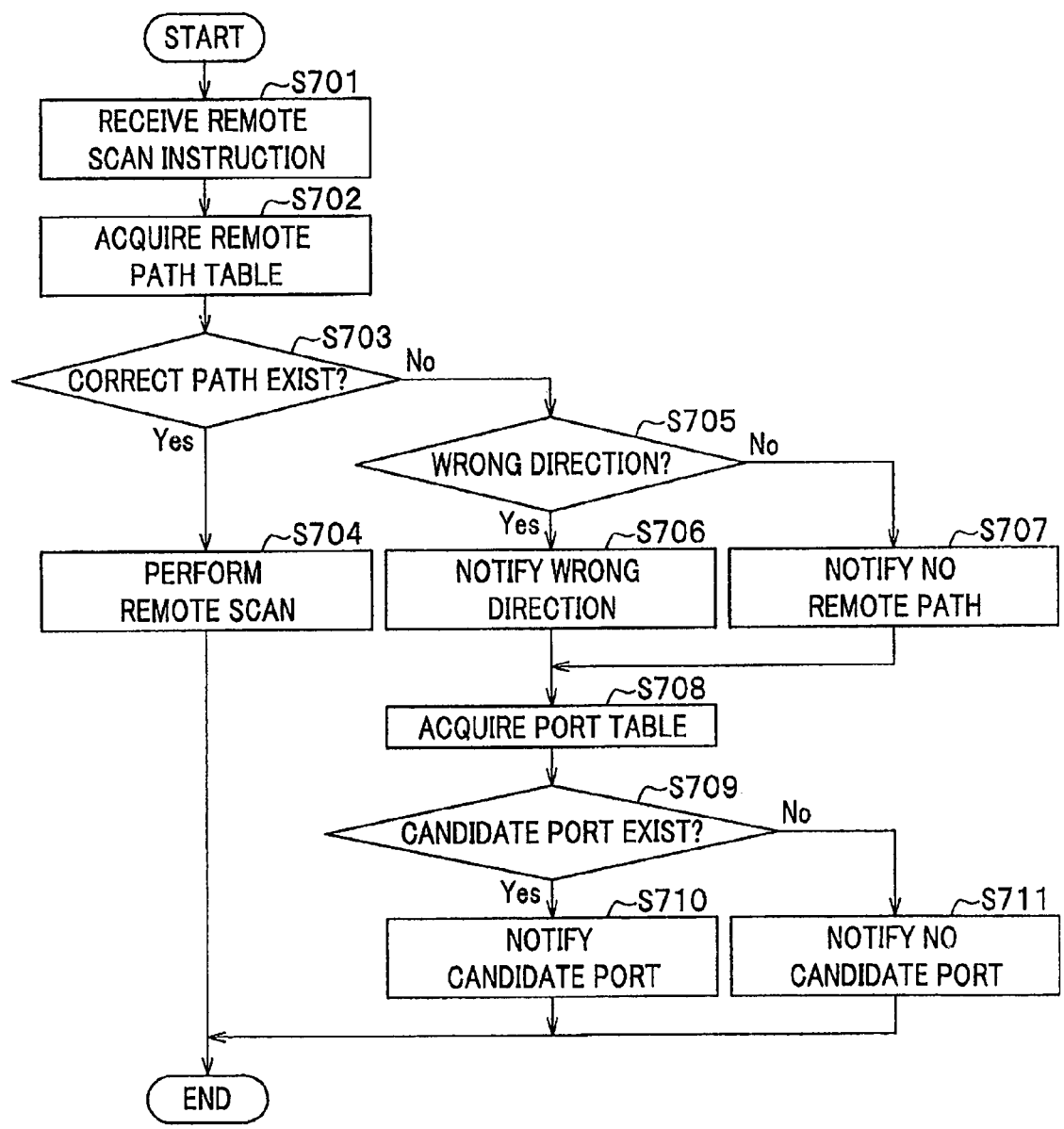
FIG. 7 is a flowchart showing a processing performed by a management program of the host according to the first embodiment.

FIG. 7 is a flowchart of a processing performed by the management program 306 in this embodiment (herein, to be more particular, it is the CPU 201 that actually executes such an operation, ditto below), when the user instructs a remote scan to the management program 306 on the host 102. The remote scan used herein means an operation of discovering (recognizing) volumes in a secondary storage from a primary storage via a remote path, as a preliminary processing for using a remote copy function.

In step S701, an instruction of a remote scan is received from the user. The instruction includes an identifier of a storage apparatus as a target of the remote scan.

In step S702, the remote path table 600 is acquired from a storage system (in FIG. 4, the storage system 101*a*) directly connected to the host 102 and is stored as a portion of the management table 307. The remote path table 600 may be acquired and stored in advance before the user instructs the remote scan. In this case, step S702 is omitted.

In step S703, it is determined whether or not the identifier of the storage apparatus as a target of the remote scan exists in the target port 604 of the remote path table 600 acquired in step S702 (that is, whether or not a correct path exists). If the identifier is determined to exist (if Yes in step S703), the processing advances to step S704. If the identifier is not determined to exist (if No in step S703), the processing advances to step S705.

In step S704, the remote scan is performed.

In step S705, it is determined whether or not the identifier of the storage apparatus as the target of the remote scan exists in the initiator port 602 of the remote path table 600 acquired in step S702 (that is, whether or not a path is in an opposite direction, that is, in a wrong direction exists). If the identifier is determined to exist (if Yes in step S705), the processing advances to step S706. If the identifier is not determined to exist (if No in step S705), the processing advances to step S707.

In step S706, the user is notified that the remote path is in the wrong direction. The notification may be displayed on a screen, for example (hereinafter the same in such notifications).

In step S707, the user is notified that the remote path for performing the remote scan does not exist.

Figure 4:
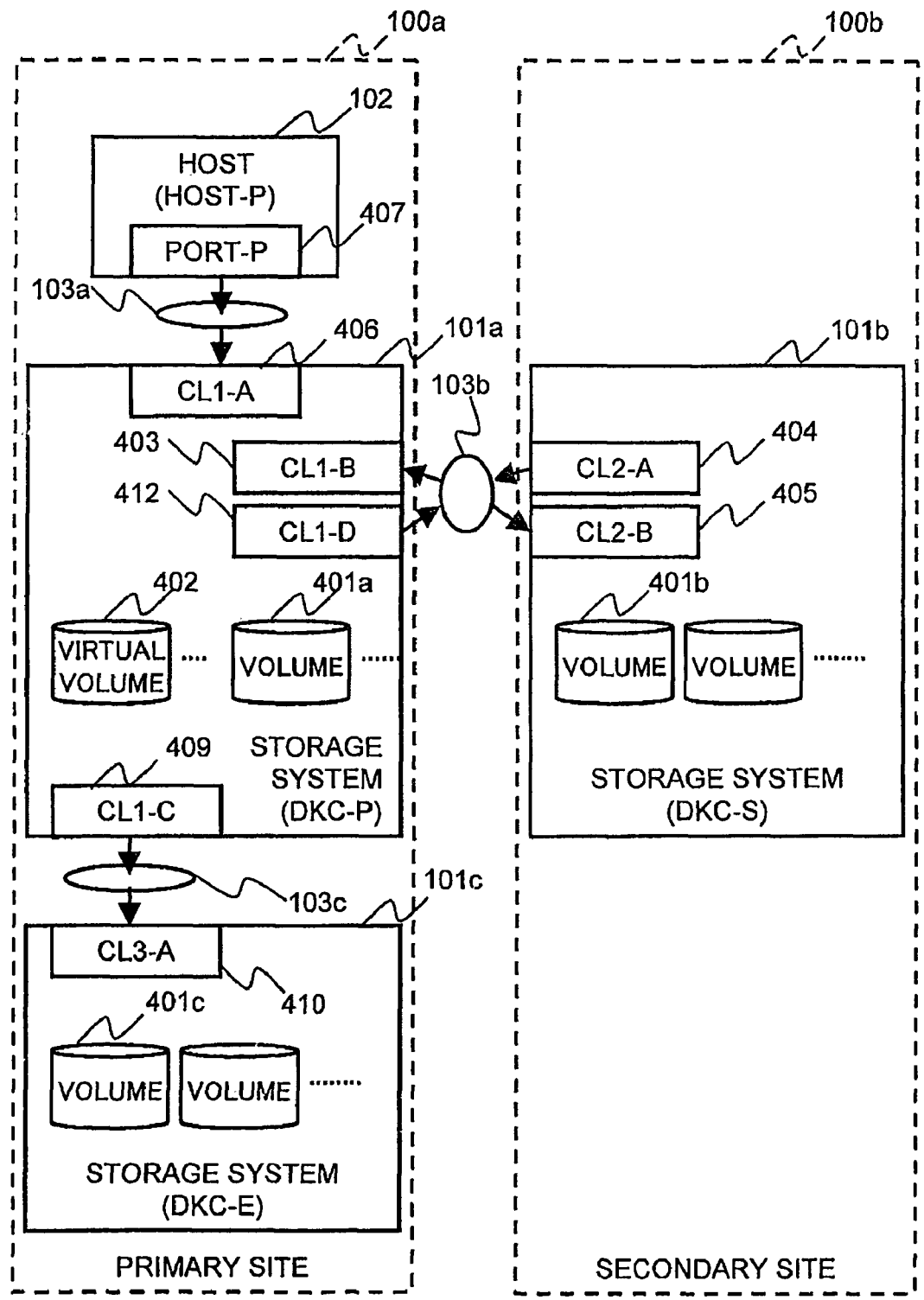
FIG. 4 is a diagram showing a state of the remote copy system according to the first embodiment.

In step S708, the port table 500 is acquired from the storage system directly connected to the host 102 (in FIG. 4, the storage system 101*a*). Note that the port table 500 may be acquired and stored in advance before the user instructs the remote scan. In this case, step S708 is omitted.

In step S709, it is determined whether or not the storage apparatus as the target of the remote scan exists in the reachable node 502 of the port table 500 acquired in step S708. If the storage apparatus is determined to exist (if Yes in step S709), the processing advances to step S710. If the storage apparatus is not determined to exist (if No in step S709), the processing advances to step S711.

In step S710, the user is notified that the initiator port 501 and the reachable port 503 corresponding to the reachable node 502 found in step S709 are candidates for the remote path setting.

In step S711, the user is notified that no candidate port exists for the remote path setting.

As described above, if the user gives a remote scan instruction targeted to DKC-S in the state of FIG. 4, the management program 306 can present to the user, as a result of the processing of FIG. 7, that the remote path is in the opposite direction (see FIG. 4 and FIG. 6) and that the CL1-D port in the DKC-P and the CL2-B port in the DKC-S are candidates for the remote path setting.

Note that, if the user only wants to check whether or not a correct remote path exits, and if any, in which direction the remote path is directed, step S708 to step S711 may not be necessary. Further, if a port as a candidate for the remote path setting is found in step S709, the management program 306 may conduct the remote path setting according to a method to be described later in detail in a third embodiment, instead of presenting the candidate to the user in step S710.

<Second Embodiment>

With reference to FIG. 8 to FIG. 17, description is given on a second embodiment of the present invention.

Figure 8:
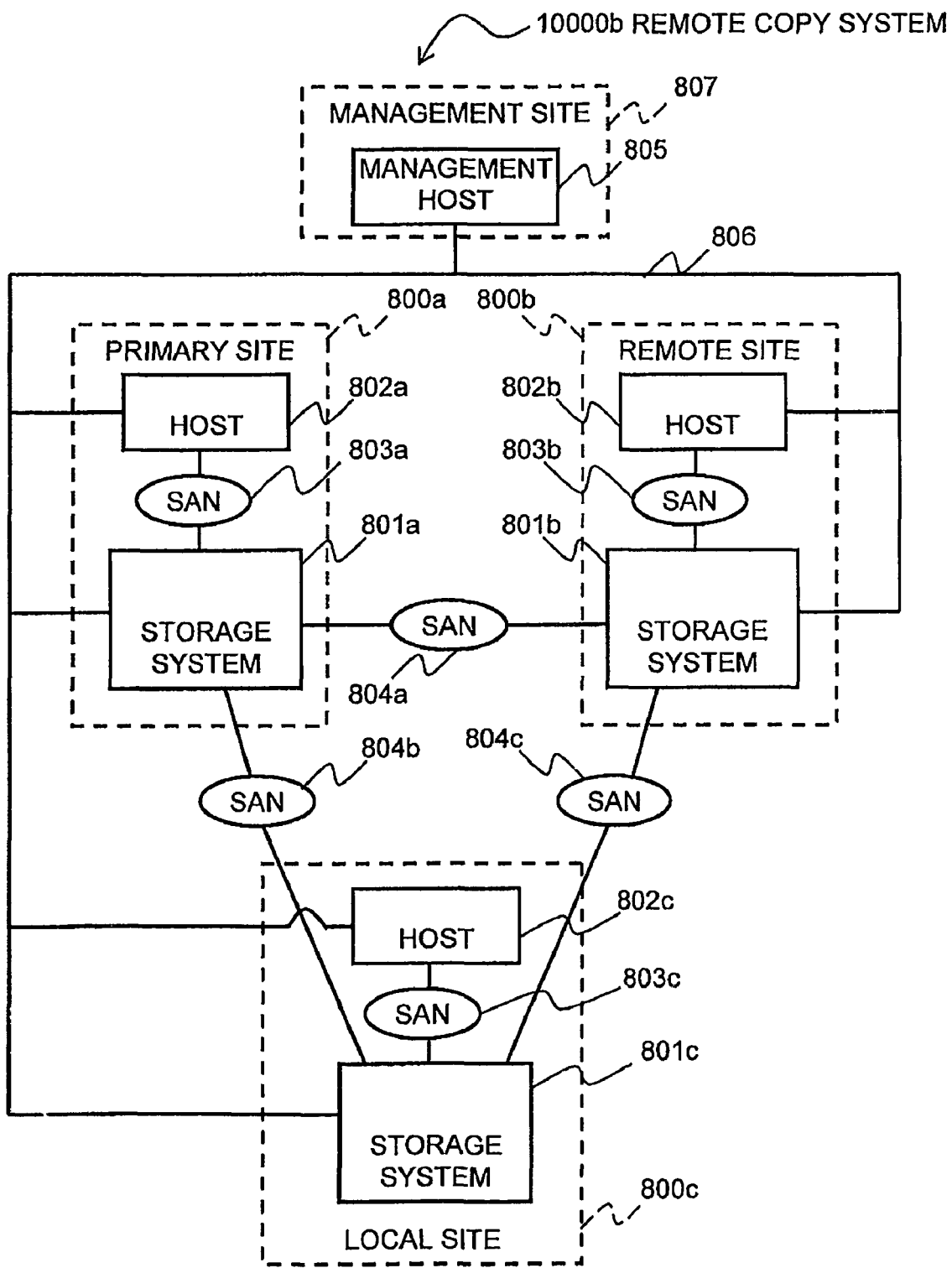
FIG. 8 is an overall block diagram showing a remote copy system according to a second embodiment.

As shown in FIG. 8, a remote copy system 10000*b* includes: a primary site 800*a*; a remote site 800*b* remotely located (for example, 100 km far) from the primary site 800*a*; and a local site 800*c* located not as far as the remote site 800*b* from the primary site 800*a*. That is, the remote copy system 10000*b* has a configuration of 3DC. The remote copy system 10000*b* also includes a management site 807 for managing a site 800 including the sites 800*a*, 800*b* and 800*c*, as a whole. In this embodiment, the remote copy system 10000*b* has the configuration of 3DC. However, the configuration of the remote copy system 10000*b* is not limited to this and may have the configuration of 2DC.

The site 800 includes a storage system 801 and a host 802. The storage system 801 and the host 802 are connected to each other via the SAN 803. The storage systems 801*a*, 801*b*, 801*c* of the site 800 are connected to each other via the SAN 804. Note that, in this embodiment, the SANs 803*a*, 803*b*, 803*c* are independent networks. However, they may be included in a single SAN. Or, one or more may be independent and the others not. The storage system 801 of the site 800 has an internal configuration same as that of the storage system 101 in the first embodiment.

A management site 807 includes a management host 805. The management host 805 is connected to the storage system 801 and the host 802 of the site 800 via a management network 806.

Figure 9:
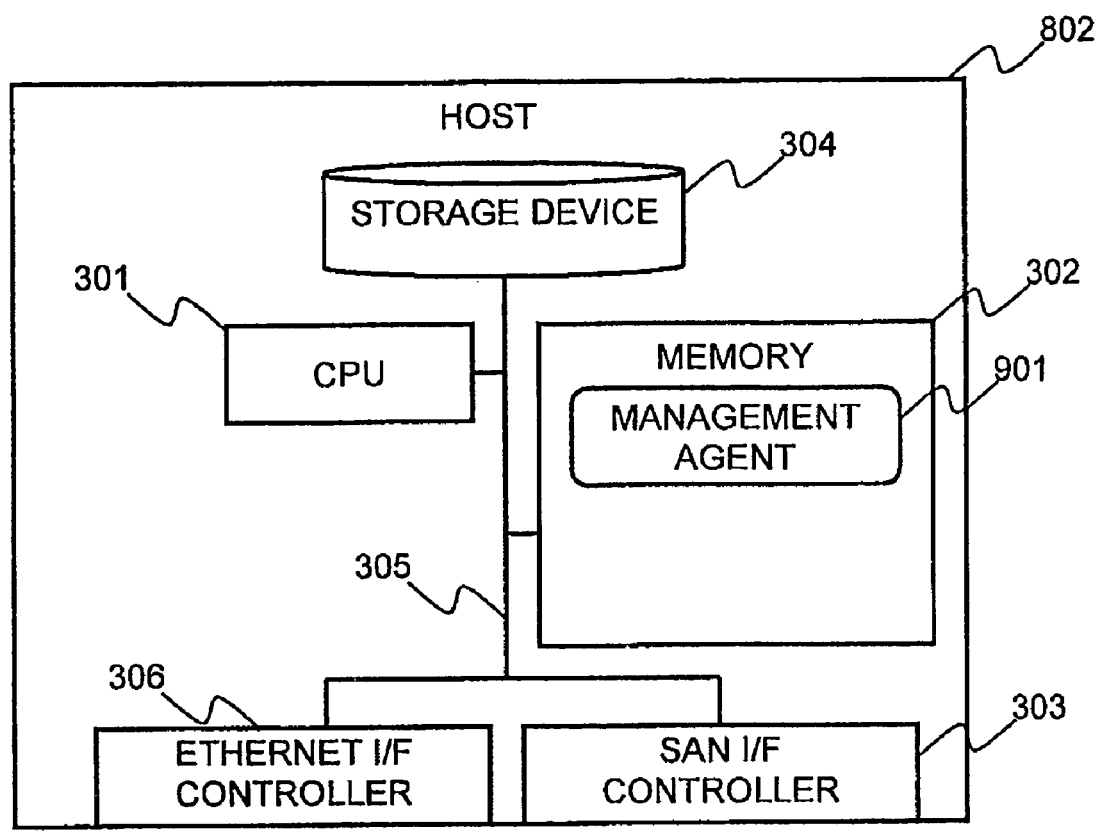
FIG. 9 is a diagram showing an internal configuration of a host according to the second embodiment.

As shown in FIG. 9, the host 802 has the same internal configuration as that of the host 102 in the first embodiment. However, the host 802 is different from the host 102 in that a program loaded in the memory 302 and executed by the CPU 301 is a management agent 901. The management agent 901 is used when a management program 1007 (to be described later with reference to FIG. 10) on the management host 805 acquires information from the host 802. For example, the management agent 901 is used in acquiring a list of volumes available for a copy pair definition.

Figure 10:
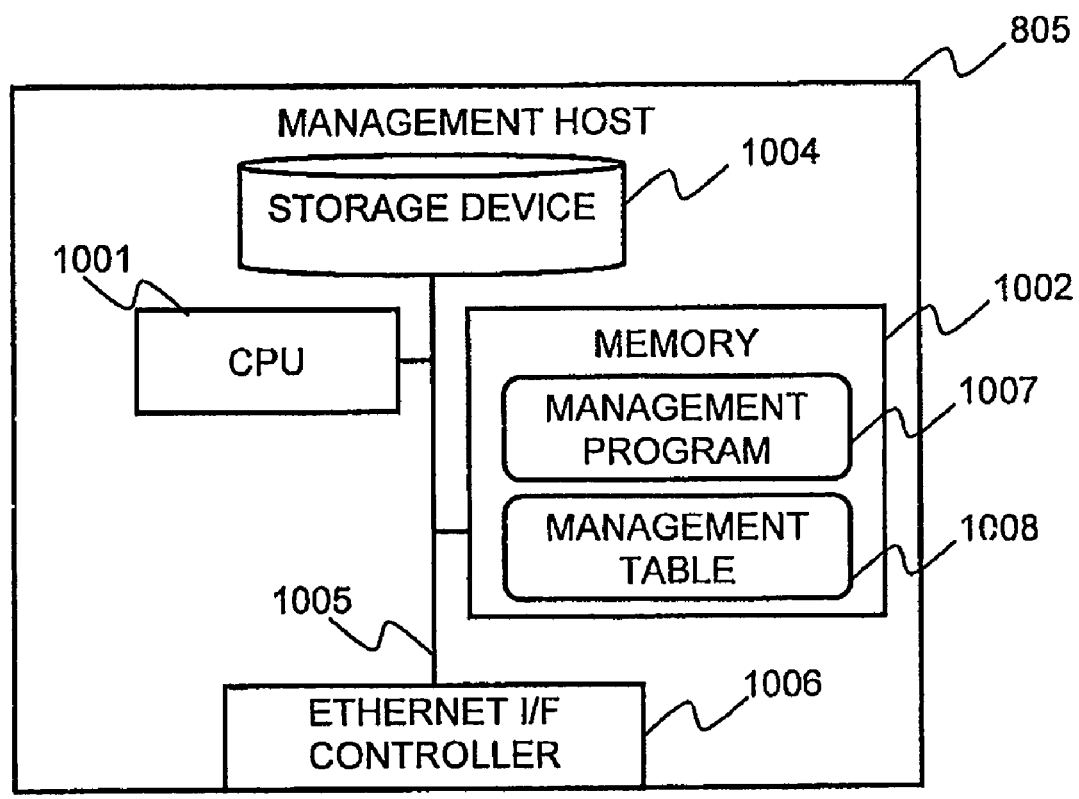
FIG. 10 is a diagram showing an internal configuration of a management host according to the second embodiment.

As shown in FIG. 10, the management host 805 includes: a CPU 1001; a memory 1002; a storage device 1004 for storing the management program 1007; and an Ethernet I/F controller 1006 for controlling data transmitted/received via the management network 806, all of which are connected to each other via an internal bus 1005.

Figure 11:
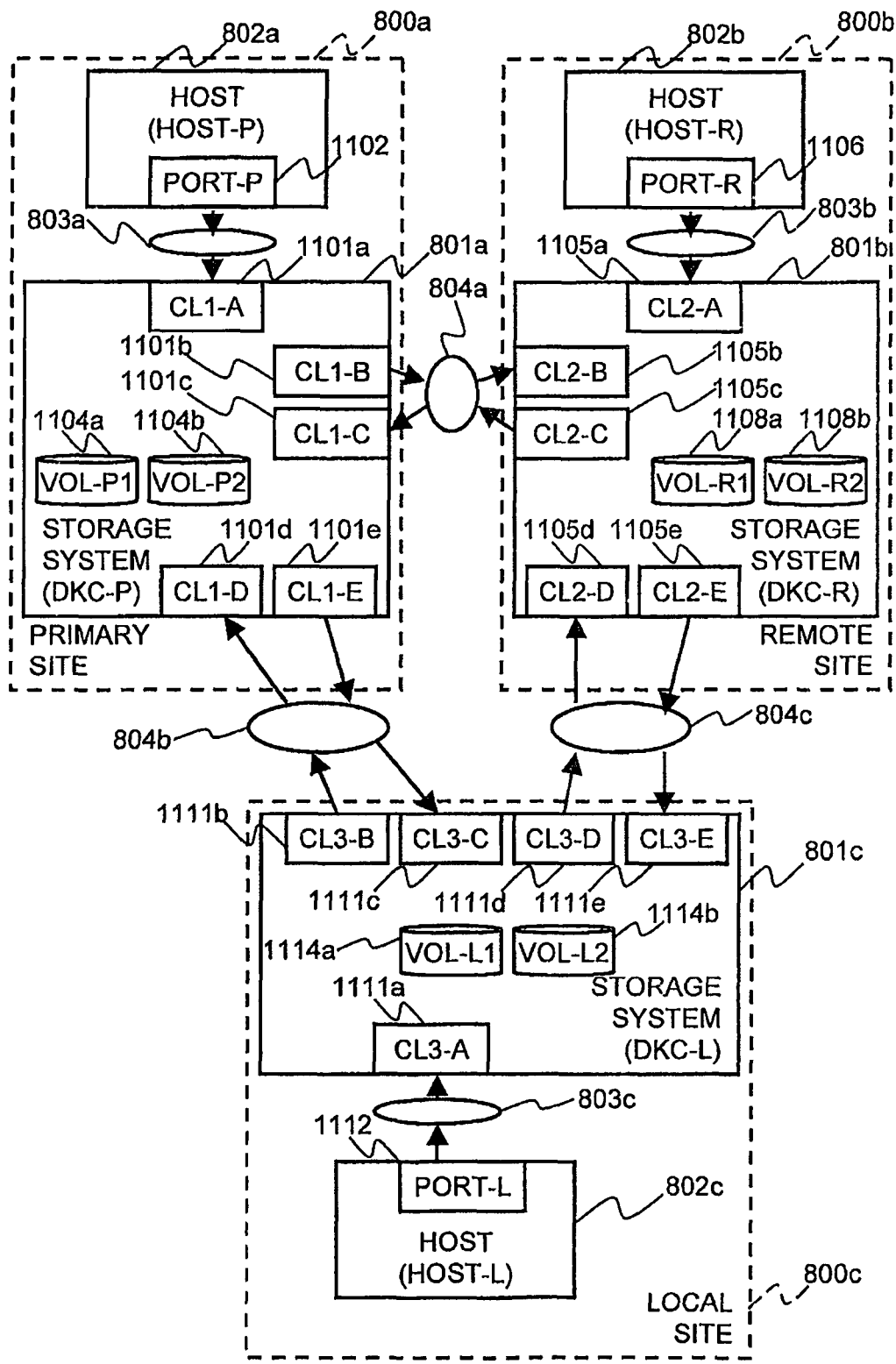
FIG. 11 is a diagram showing a state of the remote copy system according to the second embodiment.

Description below is made assuming a state shown in FIG. 11 according to the necessity. In FIG. 11, if an arrow extends from any of the ports to any of the SANs, the port is an initiator port. If an arrow extends from any of the SANs to any of the ports, the port is a target port.

The SAN I/F controller 303 (see FIG. 9) on the host. 802a at the primary site 800a has an identifier of Port-P 1102 and is connected to the SAN 803a as an initiator port. There are five SAN I/F controllers 204 (see FIG. 2) in a storage system 801a. In the storage system 801a, a target port 1101a having an identifier of CL1-A is connected to the SAN 803a; an initiator port 1101b having an identifier of CL1-B and a target port 1101c having an identifier of CL1-C, to a SAN 804a; and a target port 1101d having an identifier of CL1-D and an initiator port 1101e having an identifier of CL1-E, to a SAN 804b. The storage system 801a also includes a volume 1104a identified as Vol-P1 and a volume 1104b identified as Vol-P2.

The SAN I/F controller 303 (see FIG. 9) on the host 802b of the remote site 800b has an identifier of Port-R 1106 and is connected to the SAN 803b as an initiator port. There are five SAN I/F controllers 204 (see FIG. 2) in a storage system 801b. In the storage system 801b, a target port 1105a having an identifier of CL2-A is connected to the SAN 803b; a target port 1105b having an identifier of CL2-B and an initiator port 1105c having an identifier of CL2-C, to the SAN 804a; and a target port 1105d having an identifier of CL2-D and an initiator port 1105e having an identifier of CL2-E, to a SAN 804c. The storage system 801b also includes a volume 1108a identified as Vol-R1 and a volume 1108b identified as Vol-R2.

The SAN I/F controller 303 (see FIG. 9) on the host 802c of the local site 800c has an identifier of Port-L 1112 and is connected to the SAN 803c as an initiator port. There are five SAN I/F controllers 204 (see FIG. 2) in a storage system 801c. In the storage system 801c, a target port 1111a having an identifier of CL3-A is connected to the SAN 803c; an initiator port 1111b having an identifier of CL3-B and a target port 1111c having an identifier of CL3-C, to the SAN 804b; and an initiator port 1111d having an identifier of CL3-D and a target port 1105e having an identifier of CL3-E, to the SAN 804c. The storage system 801c also includes a volume 1114a identified as Vol-L1 and a volume 1114b identified as Vol-L2.

Further, the storage system 801a has an identifier of DKC-P assigned thereto; the storage system 801b, DKC-R; and the storage system 801c, DKC-L.

FIG. 12 shows a port table 1200 created and maintained as a portion of the management table 210 (see FIG. 2) by the micro program 209 (see FIG. 2) of the storage system 801. The port tables 1200a, 1200b and 1200c show contents maintained by the storage systems 801a, 801b and 801c in the state shown in FIG. 11, respectively. The port table 1200 includes same parameters as those of the port table 500 in the first embodiment. Similarly to the first embodiment, the micro program 209 of the storage system 801 maintains the port table 1200 which is a list of accessible target port and node acquired when an initiator port conducts a login procedure.

Figure 13:
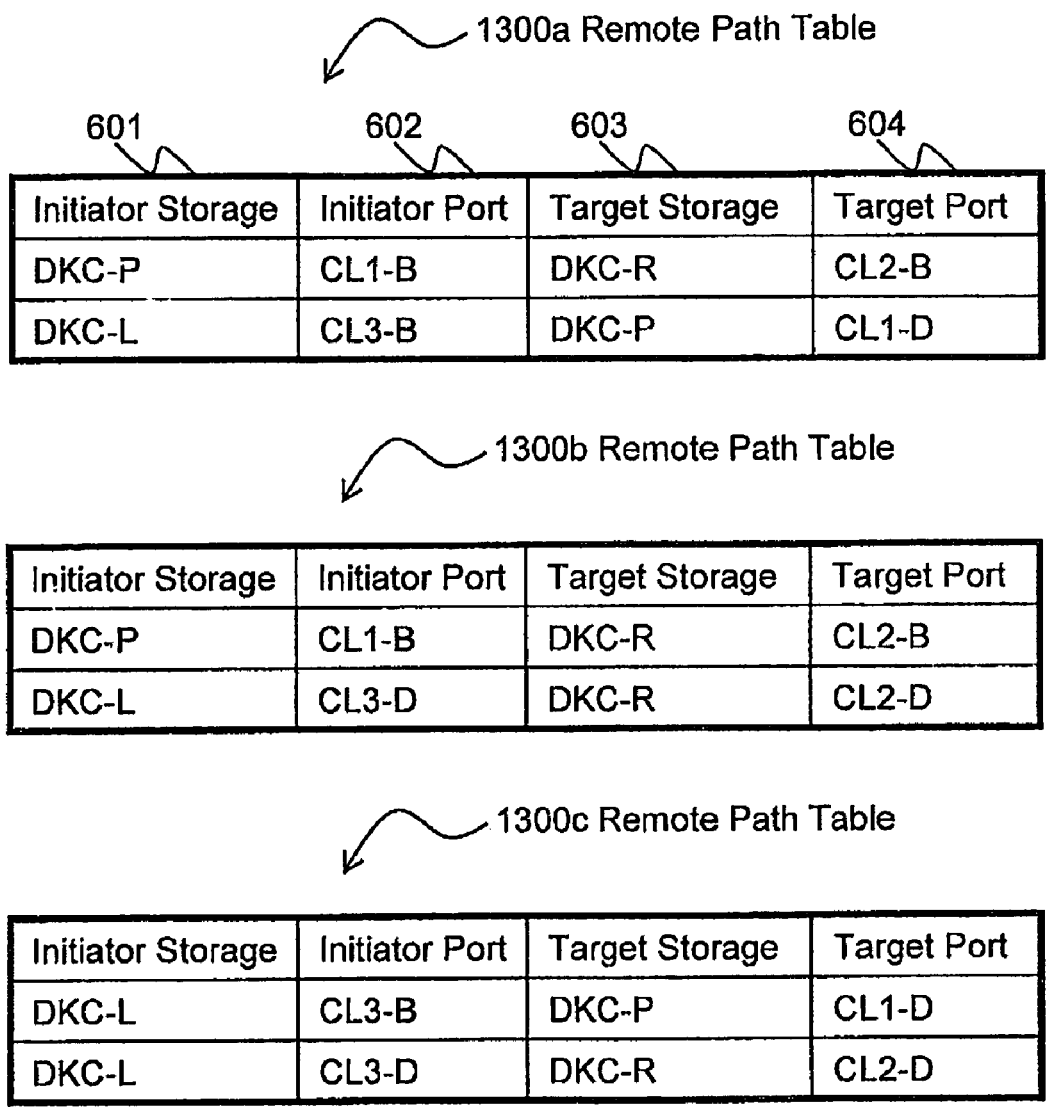
FIG. 13 is a diagram showing an example of a remote path table according to the second embodiment.

FIG. 13 is a remote path table 1300 which is maintained by the storage system 801 as a portion of the management table 210. The remote path table 1300 includes same parameters as those of the remote path table 600 in the first embodiment and maintains a remote path setting which is set by the user to the storage system 801 via the management program 1007 (see FIG. 10).

The remote path tables 1300a, 1300b and 1300c in FIG. 13 show contents maintained by the storage systems 801a, 801b and 801c, respectively. For example, the remote path table 1300a shows a state in which the user sets the initiator port CL1-B 1101b having an identifier of DKC-P in the storage system 801a and the target port CL2-B 1105b having an identifier of DKC-R in the storage system 801b which are paired as a remote path related to the storage system 801a. The remote path table 1300a also shows a state in which the user sets the initiator port CL3-B 1111b having an identifier of DKC-L in the storage system 801c and the target port CL1-D 1101d having an identifier of DKC-P in the storage system 801a which are paired as another remote path. Similarly, the remote path tables 1300b and 1300c also show their respective states.

Figures 14, 15:
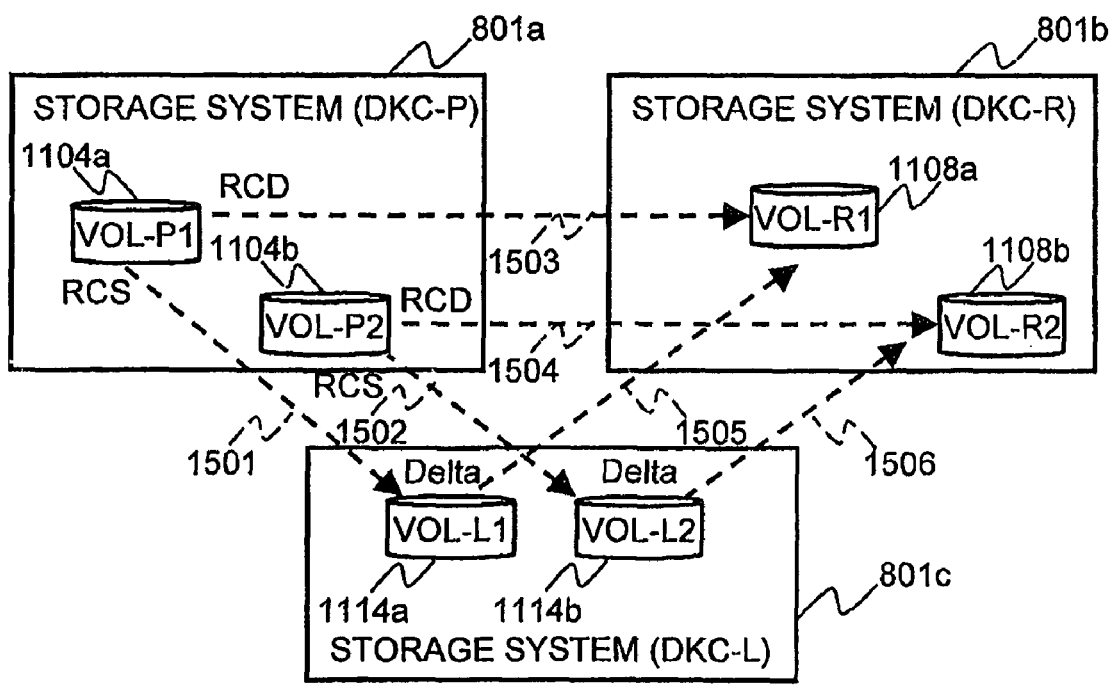
FIG. 14 is a diagram showing an example of a path requirement table according to the second embodiment.
FIG. 15 is a diagram showing an example of a remote copy configuration specified by a user according to the second embodiment.

FIG. 14 shows a path requirement table 1400 which is maintained by the management program 1007 of the management host 805 as a portion of the management table 1008. The path requirement table 1400 includes a copy type 1401 and a path requirement 1402. In performing a remote copy, as described above, a direction of a path required as a remote path depends on a type of a copy function used (push or pull).

The path requirement table 1400 shows a relation between the type of a copy function and the path direction. Row 1 shows that, if the copy type is RCS (Remote Copy Synchronous: a push-type synchronous copy), a one-way path from a primary storage to a secondary storage is required as a remote path. Row 2 shows that, if the copy type is RCA (Remote Copy Asynchronous: a push-type synchronous copy), a one-way path from the primary storage to the secondary storage is also required as the remote path. Row 3 shows that, if the copy type is RCD (Remote Copy Asynchronous with Disk: a pull-type asynchronous copy), a bidirectional path is required as the remote path. And, Row 4 shows that, if the copy type is Delta (a pull-type asynchronous copy, to be described later in detail), a bidirectional path is also required as the remote path.

FIG. 15 shows an example of a copy pair which can make a pair, and a copy group in the state shown in FIG. 11. FIG. 15 shows that a copy using the copy type of RCD (the pull-type asynchronous copy) is performed from the Vol-P1 1104a and the Vol-P2 1104b in the storage system 801a having an identifier of DKC-P (referred to as a DKC-P 801a, ditto below) to the Vol-R1 1108a and the Vol-R2 1108b in a DKC-R 801b, respectively. Also, a copy using the copy type of RCS (the push-type synchronous copy) is performed from the Vol-P1 1104a and the Vol-P2 1104b in a DKC-P 801a to the Vol-L1 1114a and the Vol-L2 1114b in a DKC-L 801c. Further, a copy using the copy type of Delta (the pull-type asynchronous copy) is performed from the Vol-L1 1114a and the Vol-L2 1114b in a DKC-L 801c to the Vol-R1 1108a and the Vol-R2 1108b in a DKC-R 801b. The copy type of Delta is a copy performed only after the primary site 800a is not available and is substituted by the local site 800c.

FIG. 16 is a copy definition table 1600 maintained by the management program 1007 as a portion of the management table 1008, when the user instructs a copy pair definition as shown in FIG. 15 via the management program 1007 on the management host 805. The copy definition table 1600 includes: a group 1601 indicating a group of a copy pair; a copy type 1602 indicating a type used for the copy; a primary storage system 1603 indicating to which storage apparatus a copy source volume belongs; a primary volume 1604 indicating an identifier of the copy source volume at the storage apparatus to which the copy source volume belongs; a secondary storage system 1605 indicating to which storage apparatus a copy destination volume belongs; and a secondary volume 1606 indicating an identifier of the copy destination volume at the storage apparatus to which the copy source volume belongs. For example, Row 1 shows that the Vol-P1 1104a in the DKC-P 801a is copied to the Vol-R1 1108a in the DKC-R 801b, using the copy type of RCD and that the copy pair belongs to a Group-PR.

Figure 17:
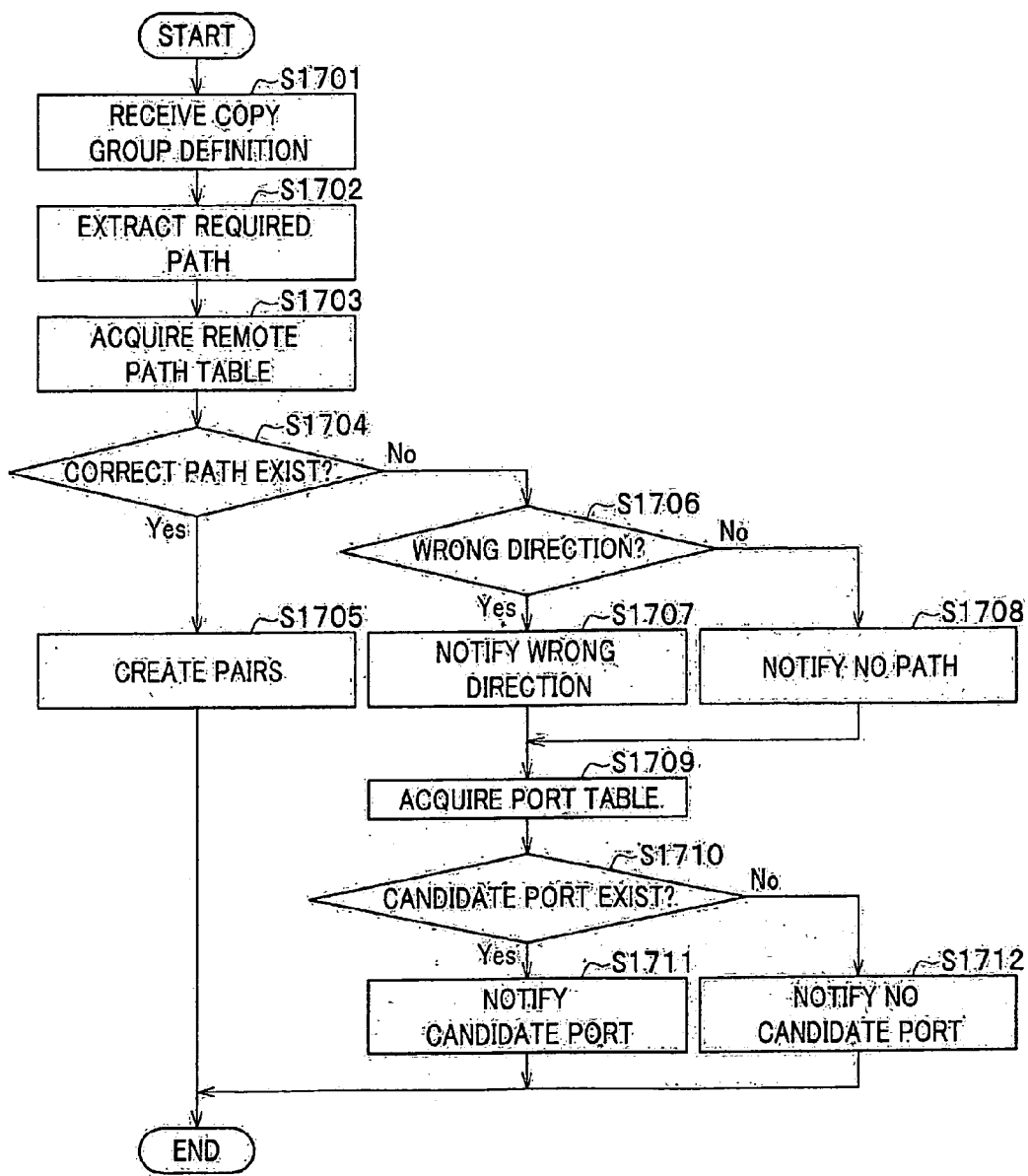
FIG. 17 is a flowchart showing a processing performed by a management program of a management host according to the second embodiment.

FIG. 17 is a flowchart showing a processing performed by the management program 1107 according to this embodiment (herein, to be more particular, it is the CPU 201 that actually executes such an operation, ditto below), if the user conducts a copy definition to the management program 1107 on the management host 805.

In step S1701, a copy definition instruction is received from the user. Contents of the copy definition are stored in the copy definition table 1600.

In step S1702, between which storage apparatuses a remote path is required is extracted from the primary storage system 1603 and the secondary storage system 1605 of the copy definition table 1600. Further, a direction of the path required between the storage apparatuses is extracted by referencing the copy type 1602 and the path requirement table 1400 (see FIG. 14). For example, Row 1 of the copy definition table 1600 shows that a path is required between the DKC-P 801a and the DKC-R 801b, and the copy type 1602 is RCD. Then, by referencing the path requirement table 1400, it is determined that a bidirectional path is required. Such a determination is made for each Row of the copy definition table 1600 by the management program 1107.

In step S1703, the remote path table 1300 is acquired from the each storage system 801 via the management network 806 and is stored as a portion of the management table 1008. Note that the remote path table 1300 may be acquired and stored in advance before the user instructs the copy definition. In this case, step S1703 is omitted.

In step S1704, it is determined whether or not the required remote path (a correct path) exists between the storage apparatuses extracted in step S1702 in the remote path table 1300 acquired in step S1703. The determination can be made by retrieving the initiator storage 601 and the target storage 603 from the remote path table 1300 which is acquired from the storage apparatus extracted as the primary storage in step S1703. In step S1702, it has been determined that a bidirectional remote path is required between the DKC-P 801a and the DKC-R 801b so as to conduct the copy shown in Row 1 of the copy definition table 1600. In this case, what is necessary is that the DKC-R is found both in the initiator storage 601 and the target storage 603 of the remote path table 1300a acquired from the DKC-P 801a. In FIG. 13, however, the DKC-R is found only in the target storage 603 of the remote path table 1300a. This means that the remote path is only one-way from the DKC-P to the DKC-R, and the required remote path does not exist. If the required path is determined to exist (if Yes in step S1704), the processing advances to step S1705. If the required path is not determined (if No in step S1704), the processing advances to step S1706.

In step S1705, a prescribed setting of a copy pair between the storage apparatuses is performed via the management network 806, and the processing terminates.

In step S1706, as a result of step S1704, it is determined whether the path, though exists, is in a wrong direction or the path does not exist. If the path is determined to exist but in the wrong direction (if Yes in step S1706), the processing advances to step S1707. If the path is not determined to exist (if No in step S1706), the processing advances to step 1708.

In step S1707, the user is notified that the remote path is in the wrong direction.

In step S1708, the user is notified that the remote path for performing the copy does not exist.

In step S1709, the port table 1200 is acquired from the storage system 801. The port table 1200 may be acquired and stored in advance before the user makes a copy definition. In this case, step S1709 is omitted.

In step S1710, it is determined whether or not an initiator port and a target port exist for creating a remote path between the storage apparatuses without any remote path extracted in step S1704. For example, in step S1704, it has been determined that the remote path in a direction from the DKC-R 801b to the DKC-P 801a is required so as to conduct the copy shown in Row 1 of the copy definition table 1600. In this case, it is determined whether or not the DKC-P exists in the reachable node 502 of the port table 1200b acquired from the DKC-R 801b. If the DKC-P is determined to exist (if Yes in step S1704) the processing advances to step S1711. If the DKC-P is not determined to exist (if No in step S1704), the processing advances to step S1712.

In step S1711, the user is notified that the initiator port 501 and the reachable port 503 corresponding to the reachable node 502 determined in step S1710 are candidate initiator and target ports for the remote path setting, respectively, and the processing terminates. For example, the CL2-C 1105c of the DKC-R 801b and the CL1-C 1101c of the DKC-P 801a are presented as candidate initiator and target ports, respectively, for the remote path setting so as to achieve the copy shown in Row 2 of the copy definition table 1600.

In step S1712, the user is notified that no candidate for the remote path setting exists, and the processing terminates.

<Third Embodiment>

A third embodiment of the present invention is described below with reference to FIG. 18 to FIG. 22.

Figure 18:
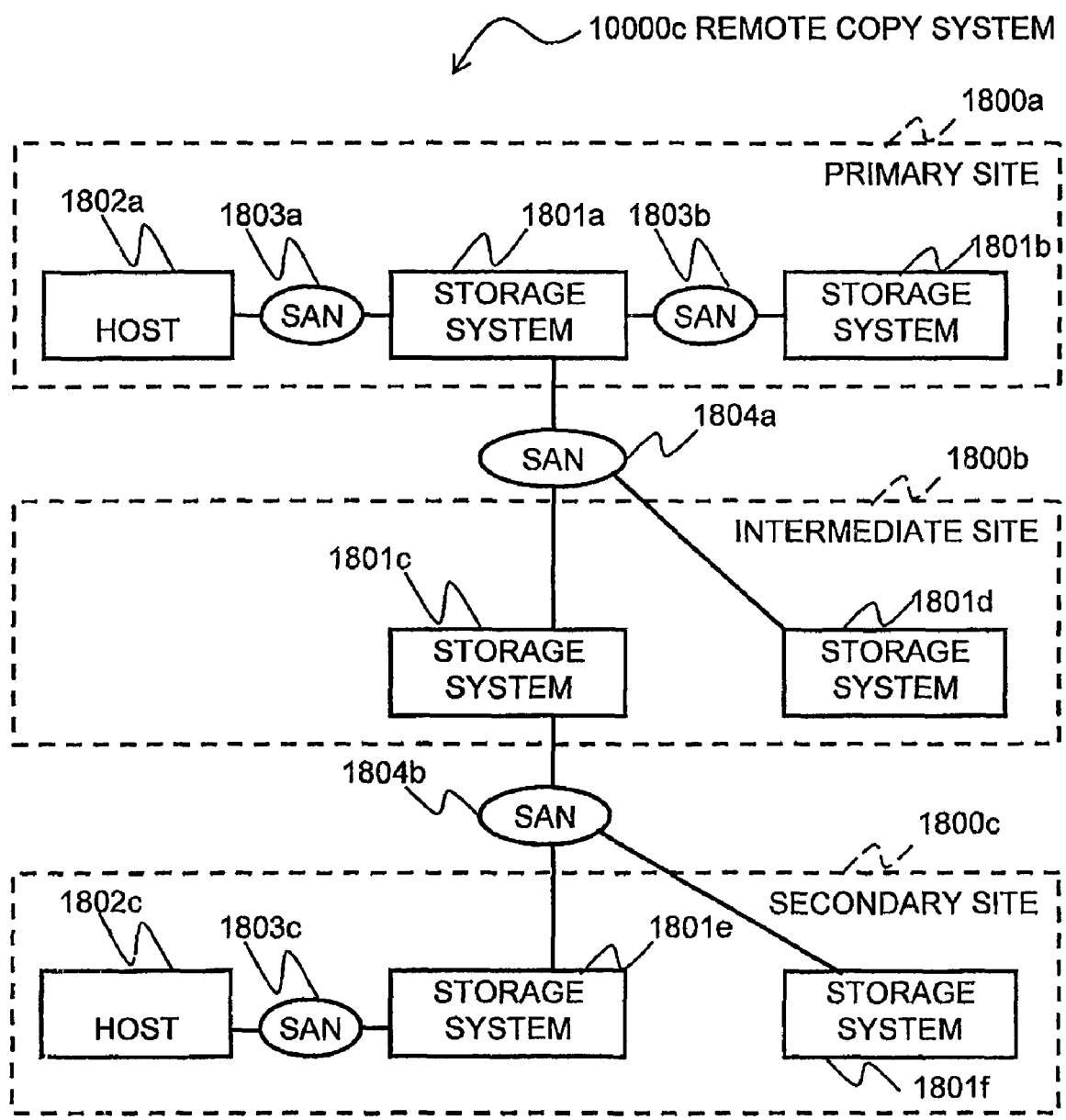
FIG. 18 is an overall block diagram showing a remote copy system according to a third embodiment.

As shown in FIG. 18, a remote copy system 10000c includes: a primary site 1800a; a secondary site 1800c remotely located from the primary site 1800a; and an intermediate site 1800b located in an intermediate position between the primary site 1800a and the secondary site 1800c. That is, the remote copy system 10000c has a configuration of 3DC. However, the configuration of the remote copy system 10000c is not limited to this and may be a 2DC configuration.

The primary site 1800a includes a host 1802a, a storage system 1801a, and a storage system 1801b. The host 1802a and the storage system 1801a are connected to each other via a SAN 1803a. The storage system 1801a and the storage system 1801b are connected to each other via a SAN 1803b. It is assumed herein that the storage system 1801b is externally connected to the storage system 1801a. For an explanatory purpose, FIG. 18 shows a state in which the storage system 1801b is provided at the primary site 1800a. However, the storage system 1801b may not be necessary in this embodiment.

The intermediate site 1800b includes a storage system 1801c and a storage system 1801d. For an explanatory purpose, FIG. 18 shows a state in which two storage systems 1801c, 1801d are provided at the intermediate site 1800b. However, the number of the storage systems is not limited to this. One or three or more storage systems may be provided at the intermediate site 1800b.

The secondary site 1800c includes a host 1802c, a storage system 1801e, and a storage system 1801f. The host 1802c and the storage system 1801e are connected to each other via a SAN 1803c. For an explanatory purpose, FIG. 18 shows a state in which two storage systems 1801e, 1801f are provided at the secondary site 1800c. However, the number of the storage systems is not limited to this. One or three or more storage systems may be provided at the intermediate site 1800c.

The storage system 1801a at the primary site 1800a is connected to both the storage systems 1801c, 1801d of the intermediate site 1800b to each other via a SAN 1804a. The storage system 1801c of the intermediate site 1800b is connected to both the storage systems 1801e, 1801f at the secondary site 1800c to each other via a SAN 1804b. In this embodiment, the SANs 1803a, 1803b, 1803c, 1804a, 1804b, are independent networks. However, they may be included in a single SAN. Or, one or more may be independent and the others not.

The storage system 1801 of the site 1800 has an internal configuration same as that of the storage system 101 in the first embodiment. In this embodiment, however, the Ethernet I/F controller 211 may not be necessary. The host 1802a at the primary site 1800a and the host 1802c at the secondary site 1800c each have a configuration same as that of the host 102 in the first embodiment. In this embodiment, however, the Ethernet I/F controller 308 may not be necessary.

Figure 19:
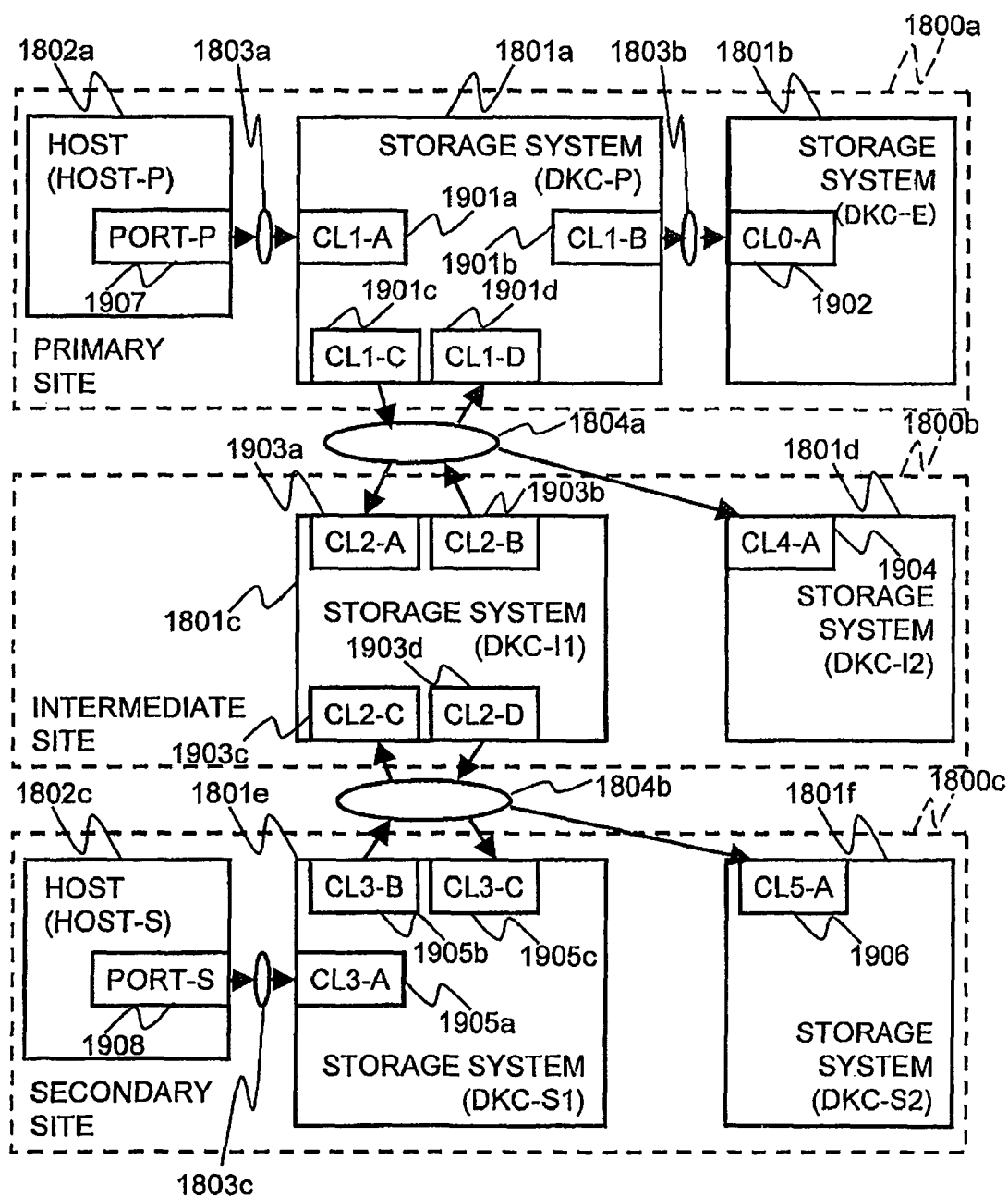
FIG. 19 is a diagram showing a state of the remote copy system according to the third embodiment.

Description below is made assuming a state shown in FIG. 19 according to the necessity.

The SAN I/F controller 303 (see FIG. 3) on the host 1802a at the primary site 1800a has an identifier of Port-P 1907 and is connected to the SAN 1803a as an initiator port. The storage system 1801a has four SAN I/F controllers 204 (see FIG. 2). A target port 1901a having an identifier of CL1-A is connected to the SAN 1803a. An initiator port 1901b having an identifier of CL1-B is connected to the SAN 1803b. An initiator port 1901c having an identifier of CL1-C and a target port 1901d having an identifier of CL1-D are each connected to the SAN 1804a. Further, the storage system 1801b has one SAN I/F controller 204 (see FIG. 2). A target port 1902 having an identifier of CL0-A is connected to the SAN 1803b.

The storage system 1801c at the intermediate site 1800b has four SAN I/F controllers 204 (see FIG. 2). A target port 1903a having an identifier of CL2-A and an initiator port 1903b having an identifier of CL2-B are each connected to the SAN 1804a. A target port 1903c having an identifier of CL2-C and an initiator port 1903d having an identifier of CL2-D are each connected to the SAN 1804b. Further, the storage system 1801d has one SAN I/F controller 204 (see FIG. 2). A target port 1904 having an identifier of CL4-A is connected to the SAN 1804a.

The SAN I/F controller 303 (see FIG. 3) on the host 1802c at the secondary site 1800c having an identifier of Port-S 1908 is connected to the SAN 1803c as an initiator port. The storage system 1801e has three SAN I/F controllers 204 (see FIG. 2). A target port 1905a having an identifier of CL3-A is connected to the SAN 1803c. An initiator port 1905b having an identifier of CL3-B and a target port 1905c having an identifier of CL3-C are each connected to the SAN 1804b. Further, the storage system 1801f has one SAN I/F controller 204 (see FIG. 2). A target port 1906 having an identifier of CL5-A is connected to the SAN 1804b.

The storage system 1801a has an identifier of DKC-P. The storage system 1801b, DKC-E. The storage system 1801c, DKC-I1. The storage system 1801d, DKC-I2. The storage system 1801e, DKC-S1. And, the storage system 1801f, DKC-S2.

FIG. 20 shows a port table 2000 created by the micro program 209 (see FIG. 2) of the storage system 1801 and maintained as a portion of the management table 210 (see FIG. 2). The port tables 2000a, 2000b show contents maintained by the storage systems 1801a, 1801c in the state shown in FIG. 19, respectively. The port table 2000 includes an initiator port 2001, a status 2002, a reachable node 2003, and a reachable port 2004. Similarly to the first embodiment, the reachable node 2003 and the reachable port 2004 are acquired from a list of accessible target port and node acquired when a port in the initiator port 2001 performs a login procedure. The status 2002 shows availability of an initiator port and includes parameters of "RC", "External", and "Unused". "RC" represents that the initiator port has already been used in a remote path setting. In which remote path setting the initiator port has already been used can be identified by referencing a remote path table 2100 to be described later with reference to FIG. 21. "External" represents that the initiator port is being used for utilizing the external connection function, which can be identified by referencing an external port list 2200 to be described later with reference to FIG. 22. "Unused" represents that the initiator port is not in the status of "RC" nor "External".

FIG. 21 shows the remote path table 2100 maintained by the storage system 1801 as a portion of the management table 210 (FIG. 2). The remote path table 2100 includes same parameters as the remote path table 600 (see FIG. 6) in the first embodiment and maintains a remote path setting which is set by the user to the storage system 1801 via the management program 306 (see FIG. 3). The remote path tables 2100a, 2100b of FIG. 21 show contents maintained by the storage systems 1801a, 1801c, respectively. The remote path table 2100a shows a state in which the user has performed the remote path setting, making a pair of the initiator port CL1-C 1901c having an identifier of DKC-P in the storage system 1801a and the target port CL2-A 1903a having an identifier of DKC-I1. The remote path table 2100b shows a state which the user has performed the remote path setting, making pairs of: the initiator port CL1-C 1901c in the DKC-P and the target port CL2-A 1903a in the DKC-I1; and the initiator port CL3-B 1905b in the DKC-S1 and the target port CL2-C 1903c in the DKC-I1.

FIG. 22 shows the external port list 2200 maintained by the each storage system 1801 as a portion of the management table 210 (see FIG. 2). The external port list 2200 is a list of an initiator port used for an external connection and is maintained by the micro program 209 (see FIG. 2) when the user sets the external connection to the storage system 1801 via the management program 306 (see FIG. 3). FIG. 22 shows that the initiator port CL1-B 1901b having an identifier of DKC-P in the storage system 1801a is used for the external connection.

Figure 23:
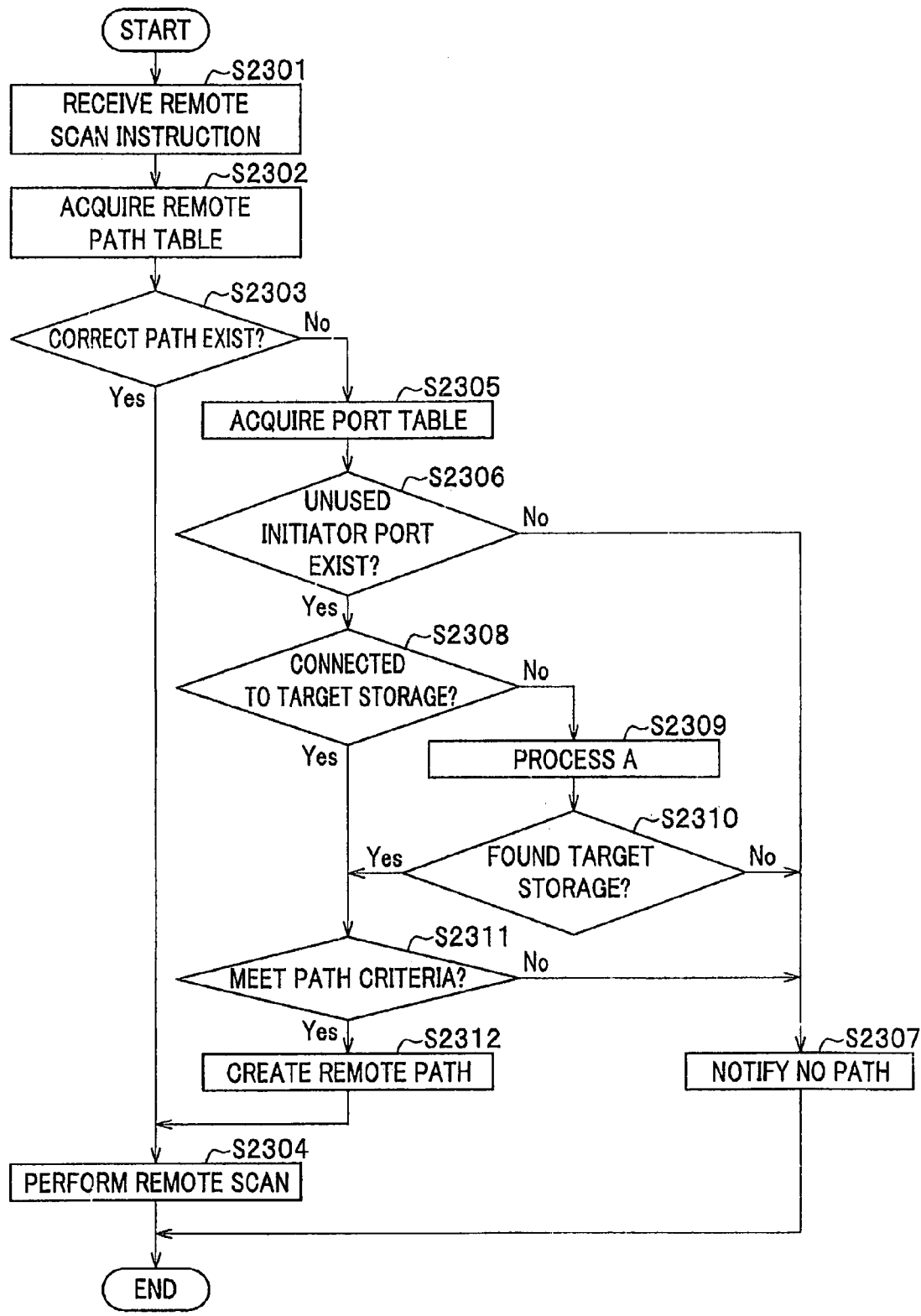
FIG. 23 is a flowchart showing a processing performed by a management program of a host according to the third embodiment.

FIG. 23 is a flowchart showing a processing performed by the management program 306 according to this embodiment, when the user instructs a remote scan to the management program 306 on the host 1802a (herein, to be more particular, it is the CPU 301 that actually executes such an operation, ditto below). As described above, the remote scan is an operation of discovering a volume in a secondary storage from a primary storage via a remote path, as a preliminary step to use a remote copy function.

In step S2301, a remote scan instruction is received from the user. The instruction includes an identifier of a storage apparatus to be remotely scanned.

In step S2302, the remote path table 2100 (see FIG. 21) is acquired from a storage apparatus (corresponding to the storage system 1801a in FIG. 19) to which a host (corresponding to the host 1802a in FIG. 19) is directly connected and is stored as a portion of the management table 307 (see FIG. 3). The remote path table 2100 (see FIG. 21) may be acquired and stored in advance before the user makes a copy definition. In this case, step S2302 is omitted.

In step S2303, it is determined whether or not an identifier (that is, a correct path) of the storage apparatus to be remotely scanned exists in the target port 604 of the remote path table 2100 (see FIG. 21) acquired in step S2302. If the identifier is determined to exist (if Yes in step S2303), the processing advances to step S2304. If the identifier is not determined to exist (if No in step S2303), the processing advances to step S2305.

In step S2304, the remote scan is performed using the remote path determined in step S2303 or a newly-created remote path to be described later in step S2312.

In step S2305, the port table 2000 (see FIG. 20) is acquired from a storage apparatus (corresponding to the storage system 1801a in FIG. 19) to which a host (corresponding to the host 1802a in FIG. 19) is directly connected, and is stored as a portion of the management table 307 (see FIG. 3). The port table 2000 (see FIG. 20) may be acquired and stored in advance before the user makes a remote scan instruction. In this case, step S2305 is omitted.

In step S2306, it is determined whether or not an unused initiator port (a port with the status 2002 of "Unused") exists in the port table 2000 (see FIG. 20) acquired in step S2305. If the unused initiator port is determined to exist (if Yes in step S2306), the processing advances to step S2308. If the unused initiator port is not determined to exist (if No in step S2306), the processing advances to step S2307.

In step S2307, the user is notified that a path required for the remote scan is not found.

In step S2308, it is determined whether or not the unused initiator port found in step S2306 is connected to the storage apparatus to be remotely scanned. The determination can be made by referencing the reachable node 2003 (see FIG. 20) corresponding to the unused initiator port found in step S2306. If any initiator port is determined to be connected (if Yes in step S2308), the processing advances to step S2311. If no initiator port is determined to be connected (if No in step S2308), the processing advances to step S2309.

In step S2309, a processing shown in a flowchart of FIG. 24 which is referred to as Process A is carried out (to be described later in detail).

In step S2310, as a result of step S2309, it is determined whether or not a path to the storage apparatus as the target of the remote scan is found. If the path is determined to be found: (if Yes in step S2310), the processing advances to step S2311. If the path is not determined to be found (if No in step S2310), the processing, returns to step S2307.

In step S2311, it is determined whether or not the path to the storage apparatus targeted for the remote scan found so far satisfies prescribed rules. The prescribed rules may include, for example, whether or not the path is a loop (that is, whether or not the path passes the same storage apparatus more than once) and whether or not the number of the storage apparatuses passed by the path is within a predetermined limit. If the path is determined to satisfy the prescribed rules (if Yes in step 2311), the processing advances to step S2312. If the path is not determined to satisfy the prescribed rules (if No in step 2311), the processing advances to step S2307.

In step S2312, a remote path to the storage apparatus as the target for the remote scan is created.

Figure 24:
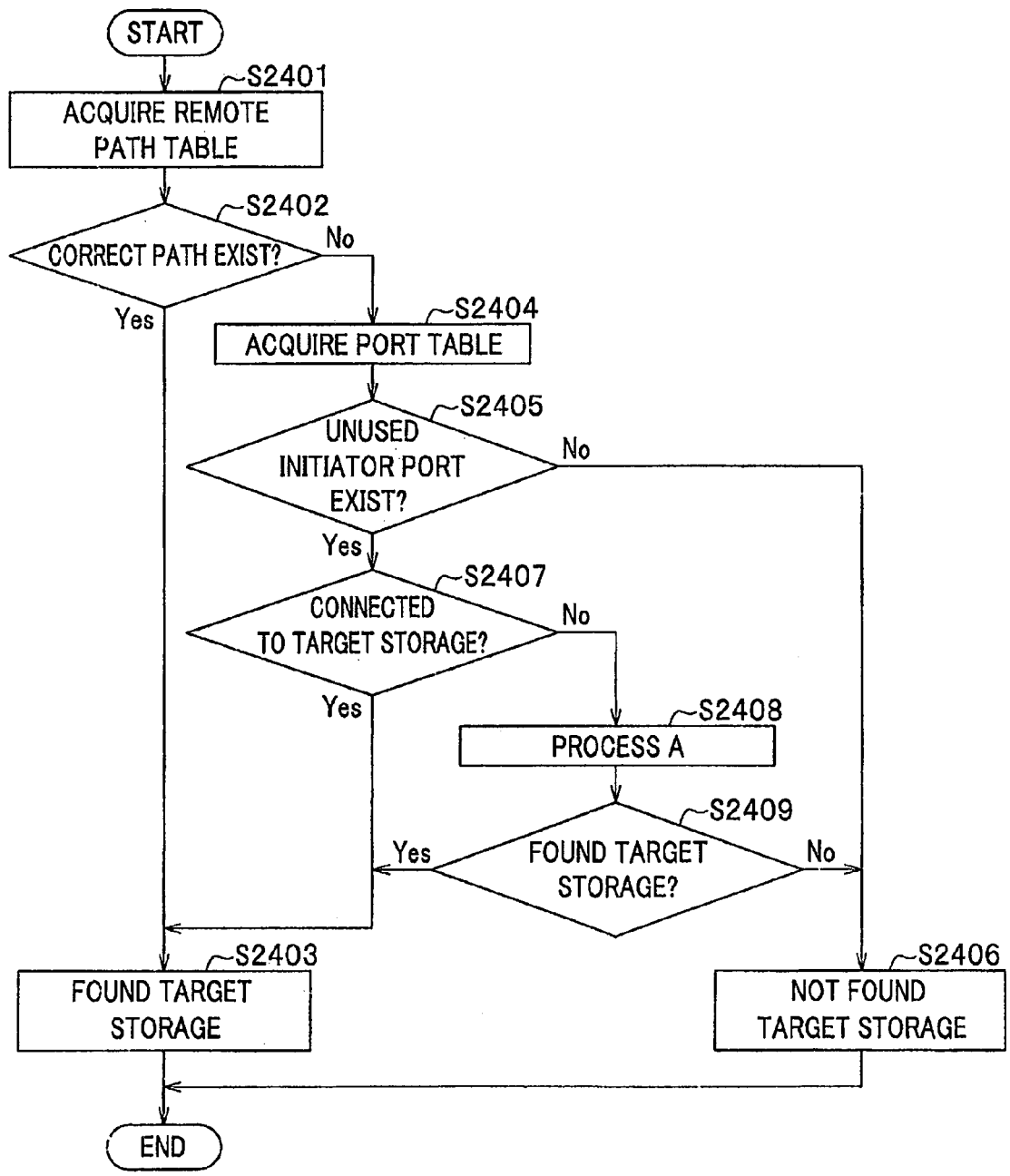
FIG. 24 is a flowchart showing a portion of the processing performed by the management program of the host according to the third embodiment.

FIG. 24 shows the processing shown in the flowchart of FIG. 23 as step S2309 and referred to as Process A.

In step S2401, the remote path table 2100 (see FIG. 21) is acquired from the storage apparatus connected to the initiator port (which can be determined from the reachable node 2003 (see FIG. 20)) via the initiator port found in step S2306 and is stored as a portion of the management table 307 (see FIG. 3).

In step S2402, it is determined whether or not an identifier of the storage apparatus targeted for the remote scan exists in the target port 604 of the remote path table 2100 (see FIG. 21) acquired in step S2401. If the identifier (a correct path) is determined to exist (if Yes in step S2402), the processing advances to step S2403. If the identifier is not determined to exist (if No in step S2402), the processing advances to step S2404.

In step S2403, it is determined that the storage apparatus targeted for the remote scan is found, and the processing advances to step S2310 of FIG. 23.

In step S2404, the port table 2000 (see FIG. 20) is acquired from the storage apparatus to which the initiator port is connected via the initiator port found in step S2306 and is stored as a portion of the management table 307 (see FIG. 3).

In step S2405, it is determined whether or not an unused port (a port with the status 2002 of "Unused") exists in the port table 2000 (see FIG. 20) acquired in step S2404. If the unused port is determined to exist (if Yes in step S2403), the processing advances to step S2407. If the unused initiator port is not determined to exist (if No in step S2403), the processing advances to step S2406.

In step S2406, it is not determined that the storage apparatus targeted for the remote scan is found, and the processing advances to step S2310 of FIG. 23.

In step S2407, it is determined whether or not the unused initiator port found in step S2405 is connected to the storage apparatus targeted for the remote scan. The determination can be easily made by referencing the reachable node 2003 (see FIG. 20). If any initiator port is determined to be connected (if Yes in step S2407), the processing advances to step S2403. If no initiator port is determined to be connected (if No in step S2407), the processing advances to step S2408.

In step S2408, Process A (the processing starting from step S2401) is recursively carried out to the storage apparatus to which the initiator port is connected (which can be determined by the reachable node 2003 (see FIG. 20)) via the unused initiator port found in step S2407.

In step S2409, as a result of step S2408, it is determined whether or not a path to the storage apparatus targeted for the remote scan is found. If the path is determined to be found (if Yes in step S2409), the processing advances to step S2403. If the path is not determined to be found (if No in step S2409), the processing to S2406.

As described above, in the remote copy system 10000 according to the embodiments, a management software on a host computer is capable of supporting a user in performing a secure remote path setting between storage apparatuses by: acquiring a remote path setting and port information from a storage apparatus; verifying whether or not a necessary remote path is created upon receiving a remote scan instruction or the like from a user; and, if the necessary remote path is not created, a candidate port available for the remote path is presented to the user. If the necessary remote path is not created, a remote path may be automatically generated under a prescribed condition.

That is, in the remote copy system 10000 according to the embodiments, even though a user improperly sets a remote path, the management software notifies the user of the improper setting. The user can easily identify a location or a cause of no remote path and can perform a secure remote path setting. Further, if the management software is configured to automatically generate a remote path at a required location, a load on the user in performing a remote path setting can be reduced.

The embodiments according to the present invention have been explained as aforementioned. However, the embodiments of the present invention are not limited to the explanation, and those skilled in the art ascertain the essential characteristics of the present invention and can make the various modifications and variations to the present invention to adapt it to various hardware configurations and specific contents of flowchart-type processings without departing from the spirit and scope of the claims.

The invention claimed is:

1. A remote copy system, comprising:
one or more host computers;
a first storage apparatus coupled to the host computer for conducting a read/write of data upon an instruction from the host computer; and
a second storage apparatus coupled to the first storage apparatus for performing a remote copy in which the data received from the first storage apparatus is stored,
wherein at least one of the first storage apparatus and the second storage apparatus holds, in a storage part thereof, path information used when performing the remote copy of the data therebetween, and
wherein the host computer references the path information in the storage part; determines whether or not a path required for conducting an operation instructed by a user exists, based on at least one of a type of the remote copy and a direction of the path; and, if the required path does not exist, displays, on a display part, that the required path does not exist and why the required path, which has been searched based on at least one of the type of the remote copy and the direction of the path, does not exist.

2. A remote copy system according to claim 1, wherein the path information includes information on a path which exists and a direct-on of the path, and wherein the host computer references the path information in the storage part and determines whether or not the path required for conducting the operation instructed by the user exists, based on the direction of the path.

3. A remote copy system according to claim 1, wherein the first storage apparatus and the second storage apparatus further hold, in the storage part thereof, port information which is information on a destination to which a port thereof is coupled, and wherein the host computer references the port information in the storage part; extracts, if the required path does not exist, a candidate port for creating the required path; and displays the candidate port on the display part.

4. A remote copy system according to claim 1, wherein the host computer determines whether or not the required path exists upon a remote scan instruction from the user.

5. A remote copy system according to claim 1, wherein the host computer determines whether or not the required path exists upon a copy definition instruction from the user.

6. A remote copy system according to claim 5, wherein the first storage apparatus and the second storage apparatus further hold, in the storage part thereof, remote copy type information which is information on a path required according to the type of a remote copy; and wherein the host computer references the remote copy type information in the storage part and determines whether or not the required path exists according to the type of the remote copy specified by the user.

7. A remote copy system according to claim 1, wherein the first storage apparatus holds the path information in the storage part thereof, wherein the first storage apparatus and the second storage apparatus hold, in the storage part thereof, port information which is information on a destination to which a port thereof is coupled, and wherein the host computer
acquires the path information from the first storage apparatus upon a remote scan instruction from the user and determines whether or not the required path exists, references the path information in the storage part, if the required path does not exist; determines whether or not a path in an opposite direction from a direction of the required path exists; displays, if the path in the opposite direction exists, that the path in the opposite direction exists, on the display part; and displays, if the path in the opposite direction does not exist, that the path in the opposite direction does not exist, on the display part, and references the port information in the storage part; determines whether or not a candidate port for creating the required path exists; displays, if the candidate port exists, that the candidate port exists, on the display part; and displays, if the candidate port does not exist, that the candidate port does not exist, on the display part.

8. A remote copy system, comprising:
one or more host computers;
a first storage apparatus coupled to the host computer for conducting a read/write of data upon an instruction from the host computer; and
a second storage apparatus coupled to the first storage apparatus for performing a remote copy in which the data received from the first storage apparatus is stored,
wherein at least one of the first storage apparatus and the second storage apparatus holds, in a storage part thereof, path information used for performing the remote copy of the data therebetween,
wherein the first storage apparatus and the second storage apparatus further hold, in the storage part thereof, port information which is information on a destination to which a port thereof is coupled, and
wherein the host computer references the path information and the port information in the storage part; determines whether or not a path required for conducting an operation instructed by a user exists, based on at least one of a type of the remote copy and a direction of the path; creates the path, if the required path does not exist and if the first storage apparatus and the second storage apparatus each have at least an available port required for the path; and conducts the operation instructed by the user.

9. A remote copy system according to claim 8, wherein the host computer determines whether or not the required path exists and creates the path upon a remote scan instruction from the user.

10. A path setting support method performed by a remote copy system, the remote copy system comprising: one or more host computers; a first storage apparatus coupled to the host computer for conducting a read/write of data upon an instruction from the host computer; and a second storage apparatus coupled to the first storage apparatus for performing a remote copy in which the data received from the first storage apparatus is stored,
wherein at least one of the first storage apparatus and the second storage apparatus holds, in a storage part thereof, path information used when performing the remote copy of the data therebetween, and
wherein the host computer references the path information in the storage part; determines whether or not a path required for conducting an operation instructed by a user exists, based on at least one of a type of the remote copy and a direction of the path; and, if the required path does not exist, displays, on a display part, that the required path does not exist and why the required path, which has been searched based on at least one of the type of the remote copy and the direction of the path, does not exist.

11. A path setting support method according to claim 10, wherein the path information includes information on a path which exists and a direction of the path, and wherein the host computer references the path information in the storage part and determines whether or not the path required for conducting the operation instructed by the user exists, based on the direction of the path.

12. A path setting support method according to claim 10, wherein the first storage apparatus and the second storage apparatus further hold, in the storage part thereof, port information which is information on a destination to which a port thereof is coupled, and wherein the host computer references the port information in the storage part; extracts, if the required path does not exist, a candidate port for creating the required path; and displays the candidate port on the display part.

13. A path setting support method according to claim 10, wherein the host computer determines whether or not the required path exists upon a remote scan instruction from the user.

14. A path setting support method according to claim 10, wherein the host computer determines whether or not the required path exists upon a copy definition instruction from the user.

15. A path setting support method according to claim 14, wherein the first storage apparatus and the second storage apparatus further hold, in the storage part thereof, remote copy type information which is information on a path required according to the type of a remote copy, and wherein the host computer references the remote copy type information in the storage part and determines whether or not the required path exists according to the type of the remote copy specified by the user.

* * * * *